US012230791B2

(12) United States Patent
Ma et al.

(10) Patent No.: US 12,230,791 B2
(45) Date of Patent: Feb. 18, 2025

(54) POSITIVE ELECTRODE ACTIVE MATERIAL, METHOD FOR THE PREPARATION THEREOF, POSITIVE ELECTRODE PLATE, SECONDARY BATTERY AND ELECTRICAL DEVICE CONTAINING THE SAME

(71) Applicant: CONTEMPORARY AMPEREX TECHNOLOGY (HONG KONG) LIMITED, Hong Kong (CN)

(72) Inventors: Qingyan Ma, Ningde (CN); Yan Wen, Ningde (CN); Yingjie Guan, Ningde (CN); Yuzhen Zhao, Ningde (CN); Qisen Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/668,268

(22) Filed: May 20, 2024

(65) Prior Publication Data
US 2024/0304798 A1 Sep. 12, 2024

Related U.S. Application Data

(63) Continuation of application No. PCT/CN2022/084856, filed on Apr. 1, 2022.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/505* (2013.01); *H01M 4/5825* (2013.01);
(Continued)

(58) Field of Classification Search
None
See application file for complete search history.

(56) References Cited

U.S. PATENT DOCUMENTS

| 6,514,640 B1 | 2/2003 | Armand et al. |
| 2023/0352674 A1* | 11/2023 | Ma .................... H01M 4/366 |

FOREIGN PATENT DOCUMENTS

| CN | 104218218 A | 12/2014 |
| CN | 105261740 A | 1/2016 |

(Continued)

OTHER PUBLICATIONS

International Search Report received in the corresponding International Application PCT/CN2022/084856, mailed Nov. 25, 2022.
(Continued)

*Primary Examiner* — Zhongqing Wei
(74) *Attorney, Agent, or Firm* — Kilpatrick Townsend & Stockton LLP

(57) ABSTRACT

Provided are a positive electrode active material, a method for the preparation thereof and a positive electrode plate, a secondary battery and an electrical device containing the same. The positive electrode active material has a core-shell structure, comprising a core and a shell cladding the core, wherein the core has a chemical formula of $Li_{1+x}Mn_{1-y}A_y P_{1-z}R_zO_4$, the shell comprises a first cladding layer cladding the core, a second cladding layer cladding the first cladding layer, a third cladding layer cladding the second cladding layer and a fourth cladding layer cladding the third cladding layer. The positive electrode active material of the present application enables the secondary battery to have a relatively high energy density, and good cycling performance, rate performance and safety performance.

24 Claims, 2 Drawing Sheets

(51) Int. Cl.
    *H01M 4/505*     (2010.01)
    *H01M 4/58*     (2010.01)
    *H01M 4/587*     (2010.01)
    *H01M 4/60*     (2006.01)

(52) U.S. Cl.
    CPC ........... *H01M 4/587* (2013.01); *H01M 4/602* (2013.01); *H01M 2004/028* (2013.01); *H01M 2220/20* (2013.01)

(56) References Cited

FOREIGN PATENT DOCUMENTS

| | | |
|---|---|---|
| CN | 106058225 A | 10/2016 |
| CN | 106816600 A | 6/2017 |
| CN | 108987697 A | 12/2018 |
| CN | 109309207 A | 2/2019 |
| CN | 110416525 A | 11/2019 |
| CN | 114256448 A | 3/2022 |
| WO | WO-2023115388 A1 * | 6/2023 |

OTHER PUBLICATIONS

Written Opinion of ISA received in the corresponding International Application PCT/CN2022/084856, mailed Nov. 25, 2022.

* cited by examiner

POSITIVE ELECTRODE ACTIVE MATERIAL, METHOD FOR THE PREPARATION THEREOF, POSITIVE ELECTRODE PLATE, SECONDARY BATTERY AND ELECTRICAL DEVICE CONTAINING THE SAME

CROSS-REFERENCE TO RELATED APPLICATION

This application is a continuation of International Application No. PCT/CN2022/084856, filed on Apr. 1, 2022, which is hereby incorporated by reference in its entirety.

TECHNICAL FIELD

The present application belongs to the technical field of batteries, in particular to a positive electrode active material, a method for the preparation thereof and a positive electrode plate, a secondary battery and an electrical device containing the same.

BACKGROUND

In recent years, secondary batteries have been widely used in energy storage power systems such as hydro, thermal, wind and solar power plants, as well as electric tools, electric bicycles, electric motorcycles, electric vehicles, military equipment, aerospace and many other fields. With the application and promotion of secondary batteries, their safety performances are receiving more and more attention. Lithium manganese phosphate has become one of the most popular positive electrode active materials due to its high capacity, good safety performance and abundant raw material sources. However, lithium manganese phosphate is prone to leaching-out of manganese ions during charging, resulting in rapid capacity decay. Therefore, it is necessary to provide a positive electrode active material with good overall performance.

SUMMARY

An object of the present application is to provide a positive electrode active material, a method for the preparation thereof, and a positive electrode plate, a secondary battery and an electrical device comprising the same, which material enables the secondary battery using the positive electrode active material to have a relatively high energy density, and good cycling performance, rate performance and safety performance.

A first aspect of the present application provides a positive electrode active material having a core-shell structure, comprising a core and a shell cladding the core, wherein the core has a chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S;

the values of x, y, and z satisfy the condition that the entire core is electrically neutral; and the shell comprises a first cladding layer cladding the core, a second cladding layer cladding the first cladding layer, a third cladding layer cladding the second cladding layer and a fourth cladding layer cladding the third cladding layer, wherein the first cladding layer comprises crystalline pyrophosphates $Li_aMP_2O_7$ and/or $M_b(P_2O_7)_c$, 0≤a≤2, 1≤b≤4, 1≤c≤6, in which the values of a, b and c satisfy the condition that the crystalline pyrophosphate $Li_aMP_2O_7$ or $M_b(P_2O_7)_c$ is electrically neutral, and in which each M in the crystalline pyrophosphates $Li_aMP_2O_7$ and/or $M_b(P_2O_7)_c$ is independently one or more elements selected from Fe, Ni, Mg, Co, Cu, Zn, Ti, Ag, Zr, Nb, and Al;

the second cladding layer comprises crystalline phosphate $XPO_4$, X being one or more elements selected from Li, Fe, Ni, Mg, Co, Cu, Zn, Ti, Ag, Zr, Nb and Al;

the third cladding layer is carbon; and the fourth cladding layer comprises a polymer comprising one or more of plant polysaccharides, marine polysaccharides, and the derivatives thereof.

The inventors have found, after extensive research, that by modifying lithium manganese phosphate and multilayer cladding of lithium manganese phosphate, a new type of positive electrode active material with a core-shell structure can be obtained, and the positive electrode active material can realize a significantly reduced leaching-out of manganese ions and a reduced rate of lattice change, and its use in the secondary battery can improve the cycling performance, rate performance, and safety performance of the battery as well as increase the capacity exertion of the battery.

In some embodiments of the present application, the substituent attached to the sugar unit in the polymer comprises at least one of the group selected from the following functional groups: —OH, —COOH and the salts thereof, —R—OH, —SO$_3$H and the salts thereof, —R—OH, —R—SO$_3$H and the salts thereof, sulphate group, alkoxy group, and R represents alkylene, optionally, C1-C5 alkylene.

Optionally, the substituent attached to the sugar unit in the polymer comprises at least one of the group selected from the following functional groups: —OH, —COOH, —COOLi, —COONa, —COOK, —SO$_3$H, —SO$_3$Li, —SO$_3$Na, —SO$_3$K, —CH$_2$—SO$_3$H, —CH$_2$—SO$_3$Li, —CH$_2$—SO$_3$Na, —CH$_2$—SO$_3$K, methoxy, and ethoxy.

In some embodiments of the present application, the plant polysaccharide comprises one or more selected from pectin, carboxymethyl starch, hydroxypropyl starch, dextrin, cellulose ether, carboxymethyl chitosan, hydroxyethyl cellulose, carboxymethyl cellulose, carboxypropylmethyl cellulose, guar gum, sesbania gum, gum arabic, and the modified polymers thereof.

In some embodiments of the present application, the marine polysaccharide comprises one or more selected from lithium alginate, sodium alginate, potassium alginate, fucoidan, agar, carrageenan, carrageenin, xanthan gum, fenugreek gum and the modified polymers thereof.

In some embodiments of the present application, the polymer has a number average molecular weight of 10,000 to 200,000, optionally of 18,000 to 120,000. The number average molecular weight of the polymer within a suitable range allows the positive electrode active material to have both good dynamic performance and cycling performance.

In some embodiments of the present application, the substituent attached to the sugar unit is present in a mass percentage α in the polymer, with a being from 20% to 85%, optionally from 30% to 78%. The mass percentage of the substituent attached to the sugar unit in the polymer within a suitable range allows a better cladding modification effect on the core.

In some embodiments of the present application, the first cladding layer has a cladding amount of greater than 0 and less than or equal to 6 wt %, optionally greater than 0 and less than or equal to 5.5 wt %, more optionally greater than 0 and less than or equal to 2 wt %, based on the weight of the core.

In some embodiments of the present application, the second cladding layer has a cladding amount of greater than 0 and less than or equal to 6 wt %, optionally greater than 0 and less than or equal to 5.5 wt %, and more optionally between 2 wt % and 4 wt %, based on the weight of the core.

In some embodiments of the present application, the third cladding layer has a cladding amount of greater than 0 and less than or equal to 6 wt %, optionally greater than 0 and less than or equal to 5.5 wt %, more optionally greater than 0 and less than or equal to 2 wt %, based on the weight of the core.

In some embodiments of the present application, the fourth cladding layer has a cladding amount of greater that 0 wt % and less than or equal to 10 wt %, optionally between 0.05 wt % and 10 wt %, more optionally between 0.1 wt % and 5 wt %, based on the weight of the core.

In the positive electrode active material with a core-shell structure described in the present application, the cladding amount of the four cladding layers is preferably within the above range, whereby sufficiently cladding the core and at the same time further improving the dynamic performance, cycling performance and safety performance of the secondary battery without sacrificing the specific capacity of the positive electrode active material.

In some embodiments of the present application, the first cladding layer has a thickness of 1 nm to 10 nm. As a result, it is possible to avoid an unfavorable effect on the dynamic performance of the material that may arise when thickness is too large, and it is possible to avoid a problem that may not be able to efficiently hinder the migration of the transition metal ions when the thickness is too small.

In some embodiments of the present application, the second cladding layer has a thickness of 2 nm to 15 nm. As a result, the second cladding layer has a stable surface structure, and small side reaction with the electrolytic solution, and thus the interfacial side reaction can be effectively mitigated, thereby improving the high-temperature cycling performance and high-temperature storage performance of the secondary battery.

In some embodiments of the present application, the third cladding layer has a thickness of 2 nm to 25 nm. As a result, the electrical conductivity of the positive electrode active material can be improved and the compaction density of the positive electrode plate prepared using the positive electrode active material can be improved.

In some embodiments of the present application, the fourth cladding layer has a thickness of 1 nm to 10 nm. As a result, it can improve the stability of the electrolytic solution of the positive electrode active material, reduce the erosion of the electrolytic solution on the surface of the positive electrode active material, and avoid the possible adverse effect on the dynamic performance of the positive electrode active material when the thickness is too large.

In some embodiments of the present application, the ratio of y:(1-y) is 1:10 to 1:1, optionally 1:4 to 1:1. As a result, the cycling performance and rate performance of the secondary battery can be further improved.

In some embodiments of the present application, the ratio of z:(1-z) is 1:9 to 1:999, optionally 1:499 to 1:249. As a result, the cycling performance and rate performance of the secondary battery can be further improved.

In some embodiments of the present application, the crystalline pyrophosphate in the first cladding layer has an interplanar spacing ranging from 0.293 nm to 0.470 nm, and a crystal orientation (111) angle ranging from 18.00° to 32.00°; and the crystalline phosphate in the second cladding layer has an interplanar spacing ranging from 0.244 nm to 0.425 nm, and a crystal orientation (111) angle ranging from 20.000 to 37.00°.

Crystalline pyrophosphate and crystalline phosphate having interplanar spacing and angle within the above range can more effectively inhibit the lattice change rate of the lithium manganese phosphate and the leaching-out of manganese ions in the process of de-intercalation of lithium, thereby enhancing the high-temperature cycling performance and high-temperature storage performance of the secondary battery.

In some embodiments of the present application, the carbon of the third cladding layer is a mixture of SP2 carbon and SP3 carbon, optionally, the molar ratio of the SP2 carbon to SP3 carbon is any value in the range of 0.1 to 10, optionally any value in the range of 2.0 to 3.0. In this application, by limiting the molar ratio of the SP2 carbon to SP3 carbon in the above range, the overall performance of the secondary battery can be improved.

In some embodiments of the present application, manganese is present in a content of 10 wt % to 35 wt %, optionally in the range of 15 wt % to 30 wt %, and more optionally in the range of 17 wt % to 20 wt %, the based on the weight of the positive electrode active material. As a result, it can effectively avoid problems such as deterioration of the structural stability of the positive electrode active material and decrease in density that may be caused if the content of manganese is too large, so as to improve the performance of the secondary battery in terms of cycling, storage and compaction density; and it can avoid problems such as a low voltage plateau that may be caused if the content of manganese is too small, so as to improve the energy density of the secondary battery.

In some embodiments of the present application, phosphorus is present in a content of 12 wt % to 25 wt %, optionally in the range of 15 wt % to 20 wt %. As a result, it can effectively avoid the following situations: if the content of phosphorus is too large, it may lead to the covalency of P—O being too strong and affect the conductivity of the small polarizers, thus affecting the electrical conductivity of the positive electrode active material; and if the content of phosphorus is too small, it may cause the lattice structure of the core, of the pyrophosphate in the first cladding layer and/or of the phosphate in the second cladding layer to be less stable, thereby affecting the overall stability of the positive electrode active material.

In some embodiments of the present application, the weight ratio of manganese to phosphorus is in the range of 0.90 to 1.25, optionally in the range of 0.95 to 1.20. As a result, it can effectively avoid the following situations: if the weight ratio is too large, it may lead to increased leaching-out of manganese ions, which affects the stability of the positive electrode active material and affects the cycling performance and the storage performance of the secondary battery; and if the weight ratio is too small, it may lead to form decreased discharge voltage plateau of the positive electrode active material, thus reducing the energy density of the secondary battery.

In some embodiments of the present application, before and after complete de-intercalation of lithium, the positive electrode active material has a lattice change rate of 4% or less, optionally 3.8% or less, more optionally 2.0% to 3.8%. As a result, the positive electrode active material can improve the capacity exertion and rate performance of the secondary battery.

In some embodiments of the present application, the positive electrode active material has a Li/Mn anti-site defect concentration of 4% or less, optionally 2.2% or less, more optionally 1.5% to 2.2%. By limiting the Li/Mn anti-site defect concentration within the above range, it is possible to avoid $Mn^{2+}$ from hindering $Li^+$ transmission, and at the same time enhance the capacity exertion and rate performance of the positive electrode active material.

In some embodiments of the present application, the positive electrode active material has a compaction density of 2.2 g/cm$^3$ or more, optionally 2.2 g/cm$^3$ or more and 2.8 g/cm$^3$ or less, at 3T. As a result, it is beneficial to improving the volumetric energy density of the secondary battery.

In some embodiments of the present application, the positive electrode active material has a surface oxygen valence of −1.90 or less, optionally −1.90 to −1.98. As a result, by limiting the surface oxygen valence of the positive electrode active material within the above range, it is possible to alleviate the interfacial side reaction of the positive electrode active material and the electrolytic solution, thereby improving the cycling performance and high-temperature storage performance and the like of the secondary battery.

A second aspect of the present application provides a positive electrode active material, comprising the following steps:
step of providing a core material having the chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S; and
step of cladding: providing a suspension of $Li_aMP_2O_7$ and/or $M_b(P_2O_7)_c$ and a suspension of $XPO_4$, separately, adding the core material to the suspensions and mixing them, and obtaining a core having a first cladding layer, a second cladding layer and a third cladding layer by sintering, mixing the obtained core having a first cladding layer, a second cladding layer and a third cladding layer with a polymer solution evenly, and obtaining the positive electrode active material by drying, in which 0≤a≤2, 1≤b≤4, 1≤c≤6, and the values of a, b and c satisfy the condition that the crystalline pyrophosphate $Li_aMP_2O_7$ or $M_b(P_2O_7)_c$ is electrically neutral, in which each M is independently one or more elements selected from Fe, Ni, Mg, Co, Cu, Zn, Ti, Ag, Zr, Nb, and Al; and X is one or more elements selected from Li, Fe, Ni, Mg, Co, Cu, Zn, Ti, Ag, Zr, Nb and Al; and in which the polymer comprises one or more of plant polysaccharides, marine polysaccharides, and the derivatives thereof,
wherein the positive electrode active material has a core-shell structure comprising the core and a shell cladding the core, in which the shell comprises a first cladding layer cladding the core, a second cladding layer cladding the first cladding layer, a third cladding layer cladding the second cladding layer and a fourth cladding layer cladding the third cladding layer, wherein the first cladding layer comprises crystalline pyrophosphates $Li_aMP_2O_7$ and/or $M_b(P_2O_7)_c$, the second cladding layer comprises crystalline phosphate $XPO_4$, the third cladding layer is carbon, and the fourth cladding layer comprises a polymer comprising one or more of plant polysaccharides, marine polysaccharides, and the derivatives thereof.

In some embodiments of the present application, the step of providing a core material comprises:
step (1): mixing a manganese source, a dopant of element A and an acid in a solvent and stirring to obtain particles of a manganese salt doped with element A; and
step (2): mixing the particles of a manganese salt doped with element A, a lithium source, a phosphorus source, and a dopant of element R in a solvent to obtain a slurry, sintering under the protection of an inert gas atmosphere to obtain a core doped with elements A and R, wherein the core doped with elements A and R has a chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S.

In some embodiments of the present application, the mixing in the step (1) is carried out at a temperature in a range of 20-120° C., optionally 40-120° C.

In some embodiments of the present application, the stirring in the step (1) is carried out at 400-700 rpm for 1-9 hours, optionally 3-7 hours.

When the heating temperature and stirring time during the step of preparing particles of core are within the above range, the prepared core and the positive electrode active material have less lattice defects, which is conducive to inhibiting the leaching-out of manganese ions, reducing the interface side reaction between the positive electrode active material and the electrolytic solution, so as to improve the cycling performance and safety performance of the secondary battery.

In some embodiments of the present application, the mixing in the step (2) is carried out at a temperature in a range of 20-120° C., optionally 40-120° C. for 1-10 hours.

In some embodiments of the present application, the dopant of element A is one or more of elemental substance, carbonates, sulfates, chlorides, nitrates, salts of organic acid, oxides and hydroxides of one or more elements selected from Zn, Al, Na, K, Mg, Mo, W, Ti, V, Zr, Fe, Ni, Co, Ga, Sn, Sb, Nb and Ge.

In some embodiments of the present application, the dopant of element R is one or more of inorganic acids, organic acids, sulfates, chlorides, nitrates, salts of organic acid, oxides, and hydroxides of one or more elements selected from B, Si, N, and S.

In some embodiments of the present application, the cladding step comprises:
a first cladding step: dissolving a source of element M, a phosphorus source and an acid, and optionally a source of lithium, in a solvent to obtain a first cladding layer suspension; mixing the core obtained in the step of providing a core material with the first cladding layer suspension obtained in the first cladding step sufficiently, drying, and sintering to obtain a first cladding layer-clad material;

a second cladding step: dissolving a source of element X, a phosphorus source and an acid in a solvent to obtain a second cladding layer suspension; mixing the first cladding layer-clad material obtained in the first cladding step with the second cladding layer suspension obtained in the second cladding step sufficiently, drying, and sintering to obtain a two cladding layers-clad material;

a third cladding step: fully dissolving a carbon source in a solvent to obtain a third cladding layer solution; then adding the two cladding layers-clad material obtained in the second cladding step to the third cladding layer solution, mixing well, drying and then sintering to obtain a three cladding layers-clad material; and a fourth cladding step: fully dissolving a polymer in a solvent to obtain a fourth cladding layer solution; then adding the three cladding layers-clad material obtained in the third cladding step to the fourth cladding layer solution, mixing well and drying to obtain a four cladding layers-clad material, i.e., a positive electrode active material.

In some embodiments of the present application, in the first cladding step the pH of a solution with a source of elemental M, a phosphorus source and an acid, and optionally a lithium source dissolved, is controlled to be 3.5 to 6.5, and then stirred and reacted for 1 hour to 5 hours, and then the solution is warmed to a temperature between 50° C. and 120° C. and maintained at that temperature for 2 hours to 10 hours.

In some embodiments of the present application, sintering in the first cladding step is carried out at 650° C. to 800° C. for 2 hours to 6 hours.

By controlling the conditions of the first cladding step within the above range, it can guarantee or even improve the capacity exertion, cycling performance, high-temperature storage performance and rate performance of the secondary battery prepared with the positive electrode active material.

In some embodiments of the present application, in the second cladding step a source of element X, a phosphorus source and an acid are dissolved in a solvent and then stirred and reacted for 1 hour to 10 hours, and then the resulting solution is warmed to a temperature between 60° C. and 150° C. and maintained at that temperature for 2 hours to 10 hours.

In some embodiments of the present application, the sintering in the second cladding is carried out at 500° C. to 700° C. for 6 hours to 10 hours.

In the step of providing the core material and in the first cladding step and the second cladding step, prior to sintering, i.e., in the preparation of the core material (steps (1)-(2)) in which the chemical reaction takes place as well as in the preparation of the first cladding layer suspension and the second cladding layer suspension, it is possible to avoid the following by selecting the appropriate reaction temperatures and the reaction times, as described above: if the reaction temperature is too low, the reaction cannot occur or the reaction rate is slow; if the temperature is too high, the product decomposes or a heterogeneous phase is formed; if the reaction time is too long, the particle size of the product is large, which may increase the time and difficulty of the subsequent process; and if the reaction time is too short, then the reaction is incomplete and less product is obtained.

In some embodiments of the present application, the sintering in the third cladding step is carried out at 700° C. to 800° C. for 6 hours to 10 hours.

By controlling the conditions of the third cladding step within the above range, it can improve capacity exertion and compaction density of the positive electrode active material.

The method of preparing the positive electrode active material of the present application has a wide source of raw materials, low cost, and simple process, which is conducive to the realization of industrialization.

A third aspect of the present application provides a positive electrode plate comprising a positive electrode current collector and a positive electrode film layer provided on at least one surface of the positive electrode current collector, wherein the positive electrode film layer comprises the positive electrode active material of the first aspect of the present application or the positive electrode active material prepared by the method of the second aspect of the present application, and the positive electrode active material is present in the positive electrode film layer in a content of 90 wt % to 99.5 wt %, based on total weight of the positive electrode film layer.

In some embodiments of the present application, the positive electrode active material is present in the positive electrode film layer in a content of 95 wt % to 99.5 wt %, based on total weight of the positive electrode film layer.

The positive electrode plate of the present application is used in a secondary battery, it can improve the energy density, cycling performance, rate performance and safety performance of the secondary battery.

A fourth aspect of the present application provides a secondary battery comprising the positive electrode active material of the first aspect of the present application, or the positive electrode active material prepared by the method of the second aspect of the present application, or the positive electrode plate of the third aspect of the present application.

A fifth aspect of the present application provides an electrical device comprising the secondary battery of the fourth aspect of the present application.

The positive electrode plate, the secondary battery, and the electrical device of the present application comprise the positive electrode active material of the present application, and thus have at least the same advantages as the positive electrode active material.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

Figure 1:
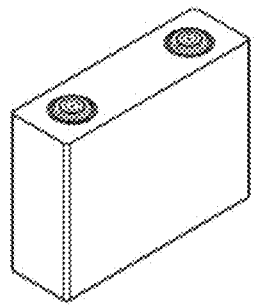
FIG. 1 is a schematic diagram of a secondary battery according to an embodiment of the present application.

In the drawings, the accompanying drawings are not necessarily drawn to an actual scale. Among them, the reference sings in the drawings are illustrated as follows: 1—battery pack, 2—upper case body, 3—lower case body, 4—battery module, 5—secondary battery, 51—housing, 52—electrode assembly, and 53—cover plate.

DETAILED DESCRIPTION

Hereinafter, embodiments of the positive electrode active material, the method for the preparation thereof, the positive electrode plate, the secondary battery, and the electrical device containing the same will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

Unless stated otherwise, the transition phases "comprise", "comprising", "contain" and "containing" mentioned in the present application mean that it is drafted in an open mode, or it may also mean a close mode. For example, the transition phases "comprise", "comprising", "contain" and "containing" may mean that other components not listed may also be included or contained, or only the listed components may be included or contained.

In the present application herein, unless otherwise stated, the term "or" is inclusive. For example, the phrase "A or B" means "A, B, or both A and B". More specifically, any of the following conditions meets "A or B": A is true (or present) and B is false (or absent); A is false (or absent) and B is true (or present); or both A and B are true (or present).

It should be noted that, as used herein, the term "cladding layer" refers to a layer of material cladding a core of lithium manganese phosphate, and the layer of material may completely or partially clad the core of lithium manganese phosphate. Use of the term "cladding layer" is used only for convenience of description and is not intended to limit the present invention. Alternatively, each cladding layer may be fully or partially clad the core. Similarly, the term "thickness of the cladding layer" refers to the thickness of a layer of material cladding a core of lithium manganese phosphate in the radial direction of core of lithium manganese phosphate.

As used herein, the term "median particle size Dv50" is a particle size at which a cumulative volume distribution percentage of a material reaches to 50%. In the present application, the median particle size Dv50 of a material may be determined using a laser diffraction particle size analysis. For example, with reference to standard GB/T 19077-2016, it is determined using a laser particle size analyzer (e.g., Malvern Master Size 3000).

The term "sugar unit" refers to a single monosaccharide attached to one or more other monosaccharide units, which sometimes refer to sugar residues. The term "polysaccharide" refers to a macromolecule consisting of a large number of sugar units linked to each other by glycosidic bonds; when all the sugar units in a polysaccharide are of the same type, the polysaccharide is referred to as a homopolysaccharide or homopolymerized sugar, and when more than one type of sugar unit is present they are referred to as heteropolysaccharides or heteropolysaccharides.

The inventors of the present application found in the actual operation that the leaching-out of manganese ions is serious during the deep charging and discharging of the lithium manganese phosphate positive electrode active material. Although the prior art have attempted to clad lithium manganese phosphate with lithium iron phosphate to reduce interfacial side reactions, such cladding cannot prevent the migration of the leached manganese ions into the electrolytic solution. The leaching-out of manganese ions are reduced to manganese metal after migration to the negative electrode. The produced metal manganese is equivalent to a "catalyst", which can catalyze the decomposition of the SEI (solid electrolyte interphase) film on the surface of the negative electrode to produce a by-product. A part of the by-product is gas, which is prone to cause the battery to expand and affect the safety performance of the battery, and another part is deposited on the surface of the negative electrode, and blocks the channel of lithium ion in and out of the negative electrode, resulting in increased impedance of the battery and affecting the dynamic performance of the battery. In addition, in order to supplement the decomposed SEI film, the electrolytic solution and the active lithium ions in the battery are continuously consumed, which also has an irreversible impact on the capacity retention rate of the battery.

The inventors have found, after extensive research, that by modifying lithium manganese phosphate and by cladding the lithium manganese phosphate with multilayers, a new type of positive electrode active material with a core-shell structure can be obtained, and the positive electrode active material can realize a significantly reduced leaching-out of manganese ions and a reduced rate of lattice change, and its use in the secondary battery can improve cycling performance, rate performance, and safety performance of the battery as well as increase the capacity performance of the battery.

Positive Electrode Active Material

A first aspect of the present application provides a new positive electrode active material having a core-shell structure, comprising a core and a shell cladding the core.

The core has a chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S; and the values of x, y, and z satisfy the condition that the entire core is electrically neutral.

The shell comprises a first cladding layer cladding the core, a second cladding layer cladding the first cladding layer, a third cladding layer cladding the second cladding layer and a fourth cladding layer cladding the third cladding layer. The first cladding layer comprises crystalline pyrophosphates $Li_aMP_2O_7$ and/or $M_b(P_2O_7)_c$, $0 \leq a \leq 2$, $1 \leq b \leq 4$, $1 \leq c \leq 6$, wherein the values of a, b and c satisfy the condition that the crystalline pyrophosphate $Li_aMP_2O_7$ or $M_b(P_2O_7)_c$ is electrically neutral; wherein each M in the crystalline pyrophosphates $Li_aMP_2O_7$ and/or $M_b(P_2O_7)_c$ is independently one or more elements selected from Fe, Ni, Mg, Co, Cu, Zn, Ti, Ag, Zr, Nb, and Al. The second cladding layer comprises crystalline phosphate $XPO_4$, X being one or more elements selected from Li, Fe, Ni, Mg, Co, Cu, Zn, Ti, Ag, Zr, Nb and Al. The third cladding layer is carbon. The fourth cladding layer comprises a polymer comprising one or more of plant polysaccharides, marine polysaccharides, and the derivatives thereof.

Unless otherwise stated, in the above chemical formula of the core, when A represents more than two elements, the above range for the y value is not only for the stoichiometric number of each element as A, but also for the sum of the stoichiometric numbers of each element as A. For example, when A represents more than two elements A1, A2 . . . and An, each of the respective stoichiometric numbers x1, x2 . . . and xn of respective A1, A2 . . . and An must fall within the numerical range defined by the present application for x, and the sum of y1, y2 . . . and yn must also fall within such numerical range of the present application. Similarly, in the case where R is more than two elements, the limitations on numerical ranges for the stoichiometric numbers of R in the present application also have the above meaning.

In an alternative embodiment, when A is one, two, three or four elements selected from Zn, Al, Na, K, Mg, Mo, W, Ti, V, Zr, Fe, Ni, Co, Ga, Sn, Sb, Nb and Ge, $A_y$ is $Q_{n1}D_{n2}E_{n3}K_{n4}$, wherein $n1+n2+n3+n4=y$, n1, n2, n3 and n4 are positive number and not all of them are zero, and Q, D, E and K are each independently selected from one of Zn, Al, Na, K, Mg, Ti, Mo, W, V, Zr, Fe, Ni, Co, Ga, Sn, Sb, Nb and Ge, optionally, at least one of Q, D, E and K is Fe. Optionally, one of the n1, n2 and n3 and n4 is zero, the rest are not zero; more optionally, two of n1, n2 and n3 and n4 are zero, the rest are not zero; and further optionally, three of n1, n2, n3 and n4 are zero, and the rest is not zero. In the core $Li_{1+x}Mn_{1-y}A_yP_{1-z}R_zO_4$, it is advantageous to doping at the manganese site with one, two, three or four of the A elements mentioned above, optionally, one, two or three of the A elements mentioned above. In addition, it is advantageous to doping at phosphorus site with one or two of the R elements, so that the doping elements are evenly distributed.

In the core $Li_{1+x}Mn_{1-y}A_yP_{1-z}R_zO_4$, the value of x is influenced by the valence of A and R and the values of y and z, so that the entire core is electrically neutral. If the value of x is too small, the lithium content of the entire core system will be reduced, which will affect the capacity exertion of the positive electrode active material. The value of y will limit the total amount of all doping elements, if y is too small, that is, the doping amount is too small, and the doping elements will not play a role, and if y is more than 0.5, it will lead to less Mn content in the system and affect the voltage plateau of the material. The R element is doped at the P site, and the larger z will affect the stability of the material since the P—O tetrahedron is relatively stable, so the value of z is limited to 0.001 to 0.100.

The positive electrode active material of the present application can improve the capacity exertion, cycling performance, rate performance and safety performance of the secondary battery. Although the mechanism is not well understood yet, it is speculated that the lithium manganese phosphate positive electrode active material has a core-shell structure, in which the manganese and phosphorus sites of the lithium manganese phosphate core are doped with elements A and R, respectively, which can not only effectively reduce the leaching-out of manganese ions, thus reduce the migration of manganese ions to the negative electrode, reduce the electrolytic solution consumed by decomposition of the SEI film, improve the cycling performance and safety performance of the secondary battery, but also can promote the adjustment of Mn—O bond, reduce migration barrier of the lithium ions, promote the migration of lithium ions, and improve the rate performance of the secondary battery. By cladding the core with the first cladding layer comprising crystalline pyrophosphate, the migration resistance of manganese ions can be further increased, reducing their leaching-out, and reducing the content of surface heterolithium and the contact between the core and the electrolytic solution, thus reducing the interfacial side reaction, reducing the gas production, and improving the high-temperature storage performance, cycling performance and safety performance of the secondary battery. By further cladding with the crystalline phosphate with excellent lithium ion conductivity as the second cladding layer, the interfacial side reaction between the positive electrode active material and the electrolytic solution can be effectively reduced, thereby improving the high-temperature cycling and storage performance of the secondary battery. By further cladding with a carbon layer as the third cladding layer, the safety performance and dynamic performance of the secondary battery can be further improved. By further cladding with a polymer as the fourth cladding layer, it can further hinder the migration of manganese ions into the electrolytic solution, and reduce the erosion of acidic substances in the electrolytic solution on the surface of the positive electrode active material, reduce the interfacial side reaction, and reduce gas production, and further improve the cycling performance and high-temperature storage performance of the secondary battery.

In addition, in the core, the doping element A at the manganese site of lithium manganese phosphate also helps to reduce the lattice change rate of the lithium manganese phosphate in the process of de-intercalation of lithium, improve the structural stability of lithium manganese phosphate positive electrode active material, greatly reduce the leaching-out of manganese ions and reduce the oxygen activity on the surface of particles. The doping element R at the phosphorus site also helps to change the difficulty of change of Mn—O bond length, thereby improving the electronic conductance and reducing the migration barrier of the lithium ion, promoting the migration of the lithium ion, and improving the rate performance of the secondary battery.

In addition, the entire core system remains electrically neutral, which ensures that there are as few defects and heterogeneous phases in the positive electrode active material as possible. If there is an excessive amount of transition metal (e.g., manganese) in the positive electrode active material, due to the more stable structure of the material system itself, the excess transition metal is likely to precipitate in the form of monomers or form a heterogeneous phase inside the crystal lattice, and keeping the electro-neutrality can keep such heterogeneous phases as few as possible. Additionally, ensuring the system is electrically neutral can also lead to the creation of lithium vacancies in the positive electrode active material in some cases, which can lead to better dynamic performance of the positive electrode active material.

The average particle size of the core prepared in the present application ranges from 50 nm to 500 nm, and the Dv50 is from 200 nm to 300 nm. The primary particle size of the core is within the range of 50 nm to 500 nm, and the median particle size Dv50 is from 200 nm to 300 nm. If the average particle size of the core is too large (more than 500 nm), the capacity exertion of the secondary battery using the material will be affected; if the average particle size of the core is too small, it has a large specific surface area and is prone to agglomeration, making it difficult to achieve uniform cladding.

Through process control (e.g., sufficient mixing and grinding of materials from various sources), it is possible to ensure that the elements are uniformly distributed in the crystal lattice without agglomeration. The X-ray diffraction (XRD) patterns of the lithium manganese phosphate doped with elements A and R has basically same primary characteristic peaks at position to undoped $LiMnPO_4$, indicating that no impurity phase is introduced in the doping process, and thus the improvement of performances of the core is mainly caused by doping of elements rather than by an impurity phase. After preparing the positive electrode active material according to the present application, the inventors cut the middle region (the inner core region) of the prepared positive electrode active material particles by a focused ion beam (referred to as FIB), and tested it by a transmission electron microscope (referred to as TEM) as well as an X-ray energy dispersive spectrometer (referred to as EDS), and found that the distribution of the various elements was uniform, and that aggregation did not occur.

In the present application, "crystalline" means having a degree of crystallinity of 50% or more, i.e., 50% to 100%. A crystallinity of less than 50% is referred to as the glassy (or amorphous) state. The crystalline pyrophosphate and crystalline phosphate described in the present application have a crystallinity from 50% to 100%. Pyrophosphate and phosphate with a certain degree of crystallinity are not only conducive to giving full play to the functions of the pyrophosphate cladding layer in hindering the leaching-out of manganese ions and the excellent lithium ion conductivity of the phosphate cladding layer, and reducing the interfacial side reactions, but also enable better lattice matching of the pyrophosphate cladding layer and the phosphate cladding layer so that a closer bonding of the cladding layers is achieved.

In the present application, the crystallinity of crystalline pyrophosphate as the material for the first cladding layer and crystalline phosphate as the material for the second cladding layer of the positive electrode active material can be tested by conventional technical means in the field, for example, by density method, infrared spectroscopy, differential scanning calorimetry, and nuclear magnetic resonance absorption method, and can also be tested, for example, by X-ray diffraction method.

A specific method for testing the crystallinity of crystalline pyrophosphate as the material for the first cladding layer and crystalline phosphate as the material for the second cladding layer of the positive electrode active material by the X-ray diffraction method may comprise the steps of taking a certain amount of the positive electrode active material powder and measuring the total scattering intensity by X-rays, which is the sum of the scattering intensities of the entire space substance, and is only related to the intensity of the primary rays, the chemical structure of the positive electrode active material powder, the total electron number (i.e., the mass), and not with the ordinal state of the sample; and then separating the crystalline scattering from the amorphous scattering, and the degree of crystallinity, i.e., the ratio of the scattering of the crystalline portion to the total intensity of the scattering.

It should be noted that in the present application, the crystallinity of the pyrophosphate and phosphate in the cladding layer can be adjusted, for example, by adjusting the process conditions of the sintering process such as the sintering temperature, the sintering time and the like.

In the present application, since metal ions are difficult to migrate in the pyrophosphate, the pyrophosphate as the first cladding layer can effectively isolate the doping metal ions from the electrolytic solution. The crystalline pyrophosphate has a stable structure, so the cladding with crystalline pyrophosphate can effectively inhibit the leaching-out of the transition metal and improve the cycling performance.

The bonding between the first cladding layer and the core is similar to a heterojunction, and the firmness of the bonding is limited by the degree of lattice matching. When the lattice mismatch is below 5%, the lattice matching is better, and the two materials are easy to combine tightly. The tight bonding can ensure that the cladding layer will not fall off in the subsequent cycling process, which is conducive to ensuring the long-term stability of the positive electrode active material. The measurement of the degree of bonding between the first cladding layer and the core is mainly carried out by calculating the degree of mismatch between the core and the respective lattice constant of the cladding. In the present application, the core doped with elements A and R has an improved matching degree between the core and the first cladding layer compared with the undoped core, and the core and the pyrophosphate cladding layer can be more tightly bonded.

Crystalline phosphate is chosen as the second cladding layer, firstly, because it has a higher lattice matching with the first cladding layer of crystalline pyrophosphate (the mismatch is only 3%); secondly, the phosphate itself has a better stability than that of the pyrophosphate, and cladding the pyrophosphate with the phosphate is conducive to the improvement of the stability of the positive electrode active material. The crystalline phosphate has a stable structure, and has excellent ability to conduct lithium ions, so the use of crystalline phosphate for cladding can effectively reduce the interfacial side reaction between positive electrode active material and electrolytic solution, thus improving the high-temperature cycling performance and high-temperature storage performance of the secondary battery. The lattice matching between the second cladding layer and the first cladding layer is similar to that of the bonding between the first cladding layer and the core as described above, and when the lattice mismatch is less than 5%, the lattice matching is better, and the two materials are easy to be bonded tightly.

The main reason for using carbon as the third cladding layer is the better electronic conductivity of the carbon layer. Since electrochemical reactions which require the participation of electrons occur when the secondary battery operates, carbon with excellent electrical conductivity can be used to clad the positive electrode active material, in order to increase the electron transfer between particles and at different locations on the particles. Cladding with carbon can effectively improve the electrical conductivity and desolvation of the positive electrode active material.

Polysaccharides and derivatives thereof are chosen as the fourth cladding layer, firstly, because polysaccharides and derivatives thereof can bind with Lewis acids such as $PF_5$ in the electrolytic solution to reduce the generation of HF, thereby alleviating the erosion of the surface of the positive electrode active material by the acid in the electrolytic solution; secondly, Polysaccharides and derivatives thereof contain a large amount of ether bonds (—O—) in the molecular structure, which can complex manganese ions, thereby reducing the leaching-out of manganese ions; in addition, the fourth cladding layer can also play a role in isolating the direct contact between the electrolytic solution and the core material. In the present application, polysaccharide derivatives include, but are not limited to, acidified (sulfated, sulfonated, phosphorylated), acetylated polysaccharides.

In some embodiments, the primary particles of the positive electrode active material have an average particle size in the range of 50 nm to 500 nm, with a median particle size Dv50 in the range of 200 nm to 300 nm. Since the particles will agglomerate, the actual measured size of the secondary particles after agglomeration may be from 500 nm to 40,000 nm. The size of the particles of the positive electrode active material affects the processing of the material and the compaction density performance of the electrode plate. By selecting the average particle size of the primary particles to be within the above range, it is thereby possible to avoid the following: the average particle size of the primary particles of the positive electrode active material being too small, which may cause agglomeration of the particles and make the particles difficult to be dispersed, and which requires a higher amount of binder, resulting in a poorer brittleness of the electrode plate; and the average particle size of the primary particles of the positive electrode active material being too large, which may result in larger inter-particle gaps and a lower compaction density.

By the above solution, the lattice change rate of lithium manganese phosphate and the leaching-out of manganese ions in the process of de-intercalation of lithium can be effectively suppressed, thereby enhancing the high-temperature cycling performance and high-temperature storage performance of the secondary battery.

In some embodiments, the crystalline pyrophosphate in the first cladding layer has an interplanar spacing ranging from 0.293 nm to 0.470 nm, and a crystal orientation (111) angle ranging from 18.00° to 32.00°; the crystalline phosphate in the second cladding layer has an interplanar spacing ranging from 0.244 nm to 0.425 nm, and a crystal orientation (111) angle ranging from 20.00° to 37.00°.

Both the first cladding layer and the second cladding layer in the positive electrode active material described in the present application use crystalline substances. The crystalline pyrophosphate and crystalline phosphate in the cladding layer can be characterized by means of conventional means in the art, for example, with the aid of transmission electron microscopy (TEM). Under TEM, the core and the cladding layer can be distinguished by testing the interplanar spacing.

The specific test method for the interplanar spacing and angle of crystalline pyrophosphate and crystalline phosphate in the cladding layer may include the following steps: taking a certain amount of the sample powder of the clad positive electrode active material in a test tube and injecting a solvent, such as alcohol, into the test tube, and then carrying out sufficient stirring and dispersion, and then taking an appropriate amount of the above solution with a clean disposable plastic pipette and adding it dropwise to a 300-mesh copper mesh, and then leaving part of the powder on the copper mesh, and transferring the copper mesh with the sample to the TEM sample chamber for testing to obtain the original picture of the TEM test. The original picture obtained from the above TEM test was opened in the diffractometer software and Fourier transformed to obtain the diffraction pattern, and the distance from the diffracted spot to the center position in the diffraction pattern was measured to obtain the interplanar spacing, and the angle may be calculated according to Bragg's equation.

The difference between the range of the interplanar spacing of the crystalline pyrophosphate and that of the crystalline phosphate can be directly judged by the value of the interplanar spacing.

Crystalline pyrophosphate and crystalline phosphate having interplanar spacing and angle within the above range can more effectively inhibit the lattice change rate of the lithium manganese phosphate and the leaching-out of manganese ions in the process of de-intercalation of lithium, thereby enhancing the high-temperature cycling performance and high-temperature storage performance of the secondary battery.

In some embodiments, in the core, the ratio of y:(1-y) is 1:10 to 1:1, optionally 1:4 to 1:1. Here y denotes the sum of the stoichiometric numbers of the Mn-site doping element A. The energy density and cycling performance of the secondary battery using the positive electrode active material can be further improved when the above conditions are satisfied.

In some embodiments, in the core, the ratio of z:(1-z) is 1:9 to 1:999, optionally 1:499 to 1:249. Here z denotes the sum of the stoichiometric numbers of the P-site doping element R. The energy density and cycling performance of the secondary battery using the positive electrode active material can be further improved when the above conditions are satisfied.

In some embodiments, the carbon of the third cladding layer is a mixture of SP2 carbon and SP3 carbon; optionally, the molar ratio of the SP2 carbon to the SP3 carbon is any value in the range of 0.1 to 10, optionally any value in the range of 2.0 to 3.0.

In some embodiments, the molar ratio of the SP2 carbon to the SP3 carbon may be about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10, or any value within any of the above ranges.

As used herein, an "about" value indicates a range of that the specified value±10%.

By selecting the morphology of the carbon in the carbon cladding layer, the overall electrochemical performance of the secondary battery is thereby enhanced. Specifically, by using a mixed morphology of SP2 carbon and SP3 carbon and limiting the ratio of the SP2 carbon to the SP3 carbon to a certain range, the following can be avoided: if the carbon in the cladding layer is all in the amorphous SP3 morphology, the electrical conductivity is poor, and if it is all in the graphitized SP2 morphology, although the electrical conductivity is good, there are few lithium ion pathways, which is not conducive to the de-intercalation of lithium ion. In addition, limiting the molar ratio of the SP2 carbon to the SP3 carbon to the above range achieves good electrical conductivity and ensures the lithium ion pathway, and is therefore conducive to improving the dynamic performance and cycling performance of the secondary battery.

The mixing ratio of the SP2 morphology and the SP3 morphology of the carbon for the third cladding layer can be controlled by sintering conditions such as sintering temperature and sintering time. For example, in the case where sucrose is used as a carbon source to prepare the third cladding layer, the sucrose is cracked at a high temperature and then deposited on the second cladding layer while at the same time under the action of high temperature, a carbon cladding layer with both the SP3 morphology and the SP2 morphology is produced. The ratio of the SP2 carbon to the SP3 carbon may be regulated by selecting the high temperature cracking conditions and the sintering conditions.

The structure and characterization of the carbon for the third cladding layer can be determined by Raman spectroscopy as follows: the molar ratio of the SP2 carbon to the SP3 carbon is confirmed by splitting the energy spectrum of the Raman test to obtain $I_d/I_g$ ($I_d$ is the intensity of the peak of the carbon in the SP3 morphology and $I_g$ is the intensity of the peak of the carbon in the SP2 morphology).

In some embodiments, the substituent attached to the sugar unit in the polymer of the fourth cladding layer comprises at least one of the group selected from the following functional groups: —OH, —COOH and the salts thereof, —R—OH, —SO$_3$H and the salts thereof, —R—OH, —R—SO$_3$H and the salts thereof, sulphate group, alkoxy group, and R represents alkylene, optionally, C1-C5 alkylene. As used herein, term "substituent attached to the sugar unit" comprises all groups attached to the sugar unit skeleton.

Optionally, the substituent attached to the sugar unit in the polymer comprises at least one of the group selected from the following functional groups: —OH, —COOH, —COOLi, —COONa, —COOK, —SO$_3$H, —SO$_3$Li, —SO$_3$Na, —SO$_3$K, —CH$_2$—SO$_3$H, —CH$_2$—SO$_3$Li, —CH$_2$—SO$_3$Na, —CH$_2$—SO$_3$K, methoxy, and ethoxy.

As an example, the plant polysaccharide comprises one or more selected from pectin, carboxymethyl starch, hydroxypropyl starch, dextrin, cellulose ether, carboxymethyl chitosan, hydroxyethyl cellulose, carboxymethyl cellulose, carboxypropylmethyl cellulose, guar gum, sesbania gum, gum arabic, and the modified polymers thereof.

As an example, the marine polysaccharide comprises one or more selected from lithium alginate, sodium alginate, potassium alginate, fucoidan, agar, carrageenan, carrageenin, xanthan gum, fenugreek gum and the modified polymers thereof.

In some embodiments, the polymer has a number average molecular weight of 10,000 to 200,000, optionally of 18,000 to 120,000. The number average molecular weight of the polymer may be determined by methods known in the art, such as by gel permeation chromatography (GPC). A PL-GPC 220 high temperature gel permeation chromatograph may be used for testing.

When the number average molecular weight of the polymer is within the suitable ranges, it is also possible to combine good dynamic performance and cycling performance of the positive electrode active material. In addition, the following conditions may be effectively avoided: if the number average molecular weight of the polymer is too small, the film formation effect on the surface of core may be poor, and the cladding modification effect on the core may not be observed, and effects of alleviating the erosion of the surface of the positive electrode active material by the acid in the electrolytic solution and reducing the leaching-out of manganese ions are not significant; and if the number average molecular weight of the polymer is too high, the force between polymers may be too strong, and the positive electrode active material may be easily agglomerated, which may reduce dynamic performance of the positive electrode active material, and may also lead to poor cladding modification effect, for example, the cladding layer tends to be uneven in thickness.

In some embodiments, the substituent attached to the sugar unit is present in a mass percentage α in the polymer, with a being from 20% to 85%, optionally from 30% to 78%. The mass percentage of the substituent attached to the sugar unit in the polymer may be determined by methods known in the art, such as by titration (e.g. acid-base titration, redox titration, precipitation titration), infrared spectroscopy, nuclear magnetic resonance spectroscopy.

The mass percentage of the substituent attached to the sugar unit in the polymer within in the suitable ranges allows better cladding modification effect on the core. In addition, the following conditions may be effectively avoided: if the mass percentage of the substituent attached to the sugar unit in the polymer is too high, the force between the polymers may be too strong, and the positive electrode active material may be easily agglomerated, which may reduce dynamic performance and cycling performance of the positive electrode active material; if the mass percentage of the substituent attached to the sugar unit in the polymer is too low, effects of alleviating the erosion of the surface of the positive electrode active material by the acid in the electrolytic solution and reducing the leaching-out of manganese ions are not significant.

In some embodiments, the fourth cladding layer is located at 40% to 90%, optionally 60% to 80% of the surface of the third cladding layer. When the cladding ratio of the fourth cladding layer on the surface of the third cladding layer is within a suitable range, the cladding modification effect on the core and other cladding layers is better, so that the cycling performance of the secondary battery can be further improved. The following conditions may be effectively avoided: if the cladding ratio of the fourth cladding layer on the surface of the third cladding layer is too high, the electronic conductivity and ionic conductivity of the positive electrode active material may become poor and the impedance of the battery may increase, thereby affecting the dynamic performance and cycling performance of the secondary battery; and if the cladding ratio of the fourth cladding layer on the surface of the third cladding layer is too low, the cladding modification effect on the core and other cladding layers may be not significant, and the effects of alleviating the erosion of the surface of the positive electrode active material by the acid in the electrolytic solution and reducing the leaching-out of manganese ions are not significant.

In some embodiments, the first cladding layer has a cladding amount of greater than 0 and less than or equal to 6 wt %, optionally greater than 0 and less than or equal to 5.5 wt %, more optionally greater than 0 and less than or equal to 2 wt %, based on the weight of the core.

In some embodiments, the second cladding layer has a cladding amount of greater than 0 and less than or equal to 6 wt %, optionally greater than 0 and less than or equal to 5.5 wt %, and more optionally between 2 wt % and 4 wt %, based on the weight of the core.

In some embodiments, the third cladding layer has a cladding amount of greater than 0 and less than or equal to 6 wt %, optionally greater than 0 and less than or equal to 5.5 wt %, more optionally greater than 0 and less than or equal to 2 wt %, based on the weight of the core.

In some embodiments, the fourth cladding layer has a cladding amount of greater that 0 wt % and less than or equal to 10 wt %, optionally between 0.05 wt % and 10 wt %, more optionally between 0.1 wt % and 5 wt %, based on the weight of the core.

In the present application, each layer has a non-zero cladding amount.

In the positive electrode active material with a core-shell structure described in the present application, the cladding amount of the four cladding layers is preferably within the above range, whereby sufficiently cladding the core and at the same time further improving the dynamic performance, cycling performance and safety performance of the secondary battery without sacrificing the specific capacity of the positive electrode active material.

For the first cladding layer, by controlling the cladding amount within the above range, the following situations can be avoided: if the cladding amount is too small, the thickness of the cladding layer is relatively thin, which may not be able to effectively hinder the migration of the transition metal; and if the cladding amount is too large, the cladding layer is too thick, which may affect the migration of $Li^+$, and thus affect the rate performance of the positive electrode active material.

For the second cladding layer, by controlling the cladding amount within the above range, the following situations can be avoided: if the cladding amount is too much, the overall platform voltage of the positive electrode active material may be affected; and if the cladding amount is too little, it may not be able to realize a sufficient cladding effect.

For the third cladding layer, the carbon cladding mainly serves to enhance the electron transfer between the particles, however, since the structure also contains a large amount of amorphous carbon, the density of the carbon is relatively low, and therefore, if the cladding amount is too large, the compaction density of the electrode plate may be affected.

For the fourth cladding layer, by controlling the cladding amount within the above range, the following situations can be avoided: if the cladding amount of the fourth cladding layer is too much, the cladding modification effect on the core may be not significant, and the effects of alleviating the erosion of the surface of the positive electrode active material by the acid in the electrolytic solution and reducing the leaching-out of manganese ions are not significant; and if the cladding amount of the fourth cladding layer is too little, the electronic conductivity and ionic conductivity of the positive electrode active material may become poor and the impedance of the battery may increase, thereby affecting the dynamic performance and cycling performance of the secondary battery.

In some embodiments, the first cladding layer has a thickness of 1 nm to 10 nm.

In some embodiments, the second cladding layer has a thickness of 2 nm to 15 nm.

In some embodiments, the third cladding layer has a thickness of 2 nm to 25 nm.

In some embodiments, the fourth cladding layer has a thickness of 1 nm to 10 nm.

In some embodiments, the first cladding layer may have a thickness of about 2 nm, about 3 nm, about 4 nm, about 5 nm, about 6 nm, about 7 nm, about 8 nm, about 9 nm, or about 10 nm, or in any range consisting of any two of the above values.

In some embodiments, the second cladding layer may have a thickness of about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or in any range consisting of any two of the above values.

In some embodiments, the third cladding layer may have a thickness of about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, or about 25 nm, or in any range consisting of any two of the above values.

In some embodiments, the fourth cladding layer may have a thickness of about 1 nm, about 3 nm, about 4 nm, about 5 nm, about 6 nm, about 7 nm, about 8 nm, about 9 nm, or about 10 nm, or in any range consisting of any two of the above values.

When the thickness of the first cladding layer is within the range of 1 nm to 10 nm, it is possible to avoid an unfavorable effect on the dynamic performance of the positive electrode active material that may arise when it is too thick, and it is possible to avoid a problem that may not be able to efficiently hinder the migration of the transition metal ions when it is too thin.

When the thickness of the second cladding layer is within the range of 2 nm to 15 nm, the surface structure of the second cladding layer is stable, and the side reaction with the electrolytic solution is small, and thus the interfacial side reaction can be effectively mitigated, thereby improving the high-temperature cycling performance and high-temperature storage performance of the secondary battery.

When the thickness of the third cladding layer is within the range of 2 nm to 25 nm, the electrical conductivity of the positive electrode active material can be improved and the compaction density of the positive electrode plate prepared using the positive electrode active material can be improved.

When the thickness of the fourth cladding layer is within the range of 1 nm to 10 nm, it can improve the electrolytic solution stability of the positive electrode active material, reduce the erosion of the electrolytic solution on the surface of the positive electrode active material, and avoid the possible adverse effect on the dynamic performance of the positive electrode active material when the thickness is too large.

The test for the thickness of the cladding layer is mainly carried out by FIB, and the specific method may comprise the following steps: randomly selecting a single particle from the positive electrode active material powder to be tested, cutting a thin slice with a thickness of about 100 nm from the middle position of the selected particle or from the vicinity of the middle position, and then carrying out a TEM test on the thin slice, measuring the thickness of the cladding layer at 3-5 positions, and taking the average value.

In some embodiments, manganese is present in a content of 10 wt % to 35 wt %, optionally in the range of 15 wt % to 30 wt %, and more optionally in the range of 17 wt % to 20 wt %, based on the weight of the positive electrode active material.

In some embodiments, phosphorus is present in a content of 12 wt % to 25 wt %, optionally in the range of 15 wt % to 20 wt %, based on the weight of the positive electrode active material.

In some embodiments, the weight ratio of manganese to phosphorus is in the range of 0.90 to 1.25, optionally in the range of 0.95 to 1.20.

In the present application, where only the core of the positive electrode active material contains manganese, the content of manganese may correspond to the amount of the core.

In the present application, limiting the content of manganese to the above range can effectively avoid problems such as deterioration of the structural stability of the positive electrode active material and decrease in density that may be caused if the content of manganese is too large, so as to improve the performance of the secondary battery in terms of cycling, storage and compaction density; and it can avoid problems such as a low voltage plateau that may be caused if the content of manganese is too small, so as to improve the energy density of the secondary battery.

In the present application, limiting the content of phosphorus to the above range can effectively avoid the following situations: if the content of phosphorus is too large, it may lead to the covalency of P—O being too strong and affect the conductivity of the small polarizers, thus affecting the electrical conductivity of the positive electrode active material; and if the content of phosphorus is too small, it may cause the lattice structure of the core, of the pyrophosphate in the first cladding layer and/or of the phosphate in the second cladding layer to be less stable, thereby affecting the overall stability of the positive electrode active material.

The weight ratio of the manganese content to the phosphorus content has the following effects on the performance of the secondary battery: if the weight ratio is too large, it means that there is too much manganese, and increased leaching-out of manganese ions, which affects the stability and capacity exertion of the positive electrode active material, and thus affects the cycling performance and the storage performance of the secondary battery; and if the weight ratio is too small, it means that there is too much phosphorus, which is prone to form a heterogeneous phase, causing decreased discharge voltage plateau of the positive electrode active material, thus reducing the energy density of the secondary battery.

The measurement of the elemental manganese and the elemental phosphorus may be carried out by technical means conventional in the art. In particular, the content of the manganese element and the phosphorus element is measured using the following method: the material is dissolved in dilute hydrochloric acid (concentration 10-30%), the content of each element of the solution is tested using ICP, and then the content of the manganese element is measured and converted to obtain its weight percentage.

In some embodiments, the positive electrode active material having a core-shell structure has a lattice change rate of 4% or less, optionally 3.8% or less, more optionally 2.0% to 3.8% before and after complete de-intercalation of lithium.

The de-intercalation of lithium in manganese phosphate ($LiMnPO_4$) is a two-phase reaction. The interfacial stress of the two phases is determined by the level of the lattice change rate before and after the de-intercalation of lithium, and the smaller the lattice change rate is, the smaller the interfacial stress is, and the easier the $Li^+$ transport is. Therefore, reducing the lattice change rate of the core will be favorable to enhance the $Li^+$ transport ability, thereby improving the rate performance of the secondary battery. The positive electrode active material having a core-shell structure described in the present application is capable of realizing a lattice change rate of 4% or less before and after the de-intercalation of lithium, and thus the use of the positive electrode active material is capable of improving the rate performance of the secondary battery. The lattice change rate can be measured by methods known in the art, such as X-ray diffraction (XRD) pattern.

In some embodiments, the positive electrode active material having a core-shell structure has a Li/Mn anti-site defect concentration of 4% or less, optionally 2.2% or less, more optionally 1.5% to 2.2%.

The term Li/Mn anti-site defect refers to interchange of $Li^+$ with $Mn^{2+}$ in terms of its site in the $LiMnPO_4$ lattice. Accordingly, the Li/Mn anti-site defect concentration refers to a percentage of $Li^+$ interchanged with $Mn^{2+}$ relative to the total amount of $Li^+$. The Li/Mn anti-site defect concentration in the present application may, for example, be tested according to JIS K 0131-1996.

The positive electrode active material having a core-shell structure described in the present application is capable of realizing the lower Li/Mn anti-site defect concentration described above. Although the mechanism is not yet well understood, the inventors of the present application speculate that since $Li^+$ and $Mn^{2+}$ will swap positions in the $LiMnPO_4$ lattice, and the $Li^+$ transport channel is a one-dimensional channel, $Mn^{2+}$ will be difficult to migrate in the $Li^+$ channel, which in turn hinders the $Li^+$ transport. As a result, the positive electrode active material having a core-shell structure described in the present application is able to avoid $Mn^{2+}$ from hindering $Li^+$ transmission and at the same time enhance the capacity exertion and rate performance of the positive electrode active material due to the low concentration of Li/Mn anti-site defects, which is within the above range.

In some embodiments, the positive electrode active material has a compaction density of 2.2 $g/cm^3$ or more, optionally 2.2 $g/cm^3$ or more and 2.8 $g/cm^3$ or less, at 3T (tonne). The higher the compaction density is, the greater the weight of the positive electrode active material per unit volume is. Thus, increasing the compaction density is conducive to improving volumetric energy density of the secondary battery. Compaction density can be measured according to GB/T 24533-2009.

In some embodiments, the positive electrode active material has a surface oxygen valence of −1.90 or less, optionally −1.90 to −1.98.

The stable valence of oxygen is originally −2, and the closer the valence state is to −2, the stronger the ability of gaining electrons, i.e., the stronger the oxidizability, and usually, the surface valence is −1.7 or less. By limiting the surface oxygen valence of the positive electrode active material to the above range as described above, it is able to mitigate the interfacial side reaction between the positive electrode active material and the electrolytic solution, thereby improving the cycling performance and the high-temperature storage performance and the like of the secondary battery.

The surface oxygen valence state can be measured by methods known in the art, such as by electron energy loss spectroscopy (EELS).

Preparation Method

A second aspect of the present application provides a method for preparing the positive electrode active material, comprising the following steps:

step of providing a core material having the chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S; and step of cladding: providing a suspension of $Li_aMP_2O_7$ and/or $M_b(P_2O_7)_c$ and a suspension of $XPO_4$, separately, adding the core material to the suspensions and mixing them, obtaining a core having a first cladding layer, a second cladding layer and a third cladding layer by sintering, mixing the obtained core having a first cladding layer, a second cladding layer and a third cladding layer with a polymer solution evenly, and obtaining the positive electrode active material by drying, in which $0 \leq a \leq 2$, $1 \leq b \leq 4$, $1 \leq c \leq 6$, and the values of a, b and c satisfy the condition that the crystalline pyrophosphate $Li_aMP_2O_7$ or $M_b(P_2O_7)_c$ is electrically neutral; in which each M is independently one or more elements selected from Fe, Ni, Mg, Co, Cu, Zn, Ti, Ag, Zr, Nb, and Al; and X is one or more elements selected from Li, Fe, Ni, Mg, Co, Cu, Zn, Ti, Ag, Zr, Nb and Al; and in which the polymer comprises one or more of plant polysaccharides, marine polysaccharides, and the derivatives thereof, wherein the positive electrode active material has a core-shell structure comprising the core and a shell cladding the core, in which the shell comprises a first cladding layer cladding the core, a second cladding layer cladding the first cladding layer, a third cladding layer cladding the second cladding layer and a fourth cladding layer cladding the third cladding layer, wherein the first cladding layer comprises crystalline pyrophosphates $Li_aMP_2O_7$ and/or $M_b(P_2O_7)_c$, the second cladding layer comprises crystalline phosphate $XPO_4$, the third cladding layer is carbon, and the fourth cladding layer comprises a polymer comprising one or more of plant polysaccharides, marine polysaccharides, and the derivatives thereof.

In some embodiments, the step of providing a core material comprises:

step (1): mixing a manganese source, a dopant of element A and an acid in a solvent and stirring to obtain particles of a manganese salt doped with element A; and step (2): mixing the particles of a manganese salt doped with element A, a lithium source, a phosphorus source, and a dopant of element R in a solvent to obtain a slurry, sintering under the protection of an inert gas atmosphere to obtain a core doped with elements A and R, wherein the core doped with elements A and R has a chemical formula of $Li_{1+x}Mn_{1-y}A_yP_{1-z}R_zO_4$, in which x is any value in the range of −0.100 to 0.100, y is any value in the range of 0.001 to 0.500, z is any value in the range of 0.001 to 0.100, A is one or more elements selected from Zn, Al, Na, K, Mg, Mo, W, Ti, V, Zr, Fe, Ni, Co, Ga, Sn, Sb, Nb and Ge, optionally one or more elements selected from Fe, Ti, V, Ni, Co and Mg, and R is one or more elements selected from B, Si, N and S, optionally, the R is one element selected from B, Si, N and S.

The preparation method of the present application has no special restriction on the source of the material. The source of an element may include one or more of elemental substance, sulfates, halides, nitrates, salts of organic acid, oxides or hydroxides of the element, provided that the source can achieve the purpose of the preparation method of the present application.

In some embodiments, the dopant of element A is one or more of elemental substance, carbonates, sulfates, chlorides, nitrates, salts of organic acid, oxides and hydroxides of one or more elements selected from Zn, Al, Na, K, Mg, Mo, W, Ti, V, Zr, Fe, Ni, Co, Ga, Sn, Sb, Nb and Ge.

In some embodiments, the dopant of element R is one or more of inorganic acids, organic acids, sulfates, chlorides, nitrates, salts of organic acid, oxides, and hydroxides of one or more elements selected from B, Si, N, and S. In the present application, the manganese source may be a manganese-containing substance known in the art that can be used to prepare lithium manganese phosphate. For example, the manganese source may be one or more selected from elemental manganese, manganese dioxide, manganese phosphate, manganese oxalate, and manganese carbonate.

In some embodiments, the acid is one or more selected from hydrochloric acid, sulfuric acid, nitric acid, phosphoric acid, organic acids such as silicic acid and mttasilicic acid and organic acids such as oxalic acid. In some embodiments, the acid is a diluted organic acid with a concentration of 60 wt % or less.

In the present application, the lithium source may be a lithium-containing substance known in the art that can be used to prepare lithium manganese phosphate. For example, the lithium source may be one or more selected from lithium carbonate, lithium hydroxide, lithium phosphate, and lithium dihydrogen phosphate.

In the present application, the phosphorus source may be a phosphorus-containing substance known in the art that can be used to prepare lithium manganese phosphate. For example, the phosphorus source may be one or more selected from diammonium hydrogen phosphate, ammonium dihydrogen phosphate, ammonium phosphate and phosphoric acid.

In some embodiments, the manganese source, the dopant of element A and the acid react in the solvent to obtain a suspension of a manganese salt doped with element A, and then the suspension is filtered, dried, and sanded to obtain particles of manganese salt doped with element A with a particle size of 50 nm to 200 nm.

In some embodiments, the slurry in the step (2) is dried to obtain a powder, paste and powder is sintered to obtain a core doped with elements of A and R.

In some embodiments, the mixing in the step (1) is carried out at a temperature in a range of 20-120° C., optionally 40-120° C.

In some embodiments, the stirring in the step (1) is carried out at 400-700 rpm for 1-9 hours, optionally 3-7 hours.

Optionally, the reaction temperature in the step (1) may be about 30° C., about 50° C., about 60° C., about 70° C., about 80° C., about 90° C., about 100° C., about 110° C. or about 120° C.; and the stirring in the step (1) is carried out for about 2 hours, about 3 hours, about 4 hours, about 5 hours, about 6 hours, about 7 hours, about 8 hours or about 9 hours. Optionally, the reaction temperature or stirring time in the step (1) may be within any range consisting of any two of the above values.

In some embodiments, the mixing in the step (2) is carried out at a temperature of 20-120° C., optionally 40-120° C. for 1-12 hours. Optionally, the reaction temperature in step (2) may be about 30° C., about 50° C., about 60° C., about 70° C., about 80° C., about 90° C., about 100° C., about 110° C. or about 120° C.; and the mixing in the step (2) is carried out for about 2 hours, about 3 hours, about 4 hours, about 5 hours, about 6 hours, about 7 hours, about 8 hours, about 9 hours, about 10 hours, about 11 hours or about 12 hours. Optionally, the reaction temperature or mixing time in the step (2) may be within any range consisting of any two of the above values.

When the temperature and time in the preparation method of particles of the core are within the above range, the prepared core and the positive electrode active material have less lattice defects, which is conducive to inhibiting the leaching-out of manganese ions, reducing the interface side reaction between the positive electrode active material and the electrolytic solution, so as to improve the cycling performance and safety performance of the secondary battery.

In some implementations, optionally, in the preparation of particles of lithium manganese phosphate doped with elements A and R, pH of the solution is controlled to be 3.5 to 6, optionally, pH of the solution is controlled to be 4 to 6, more optionally, pH of the solution is controlled to be 4 to 5. It is to be noted that the pH of the obtained mixture may be adjusted in the present application by a method commonly used in the art, for example, by the addition of an acid or base.

In some implementations, optionally, in step (2), the molar ratio of the particles of manganese salt doped with element A, the lithium source, and the phosphorus source is 1:(0.5 to 2.1): (0.5 to 2.1), more optionally, the molar ratio of the particles of manganese salt doped with element A, the lithium source, and the phosphorus source is about 1:1:1.

In some embodiments, optionally, the sintering conditions during the preparation of the lithium manganese phosphate doped with elements A and R are: sintering at 600-950° C. for 4-10 hours under an inert gas or a mixed atmosphere of inert gas and hydrogen; optionally, the sintering can be performed at about 650° C., about 700° C., about 750° C., about 800° C., about 850° C. or about 900° C. for about 2 hours, about 3 hours, about 4 hours, about 5 hours, about 6 hours, about 7 hours, about 8 hours, about 9 hours, or about 10 hours; optionally, the sintering temperature or sintering time can be in any range consisting of any two of the above values. In the process of preparing lithium manganese phosphate doped with elements A and R, if the sintering temperature is too low and the sintering time is too short, the core of the positive electrode active material may have a low crystallinity, thereby affecting the overall performance; if the sintering temperature is too high, the core of positive electrode active material may form a heterogeneous phase, thereby affecting the overall performance; and if the sintering time is too long, the particles of the core of the positive electrode active material is large, thereby affecting the capacity exertion, compaction density and rate performance.

In some embodiments, optionally, the protective atmosphere is a mixture of 70-90 volume % nitrogen and 10-30 volume % hydrogen.

In some embodiments, the cladding step comprises:
a first cladding step: dissolving a source of element M, a phosphorus source and an acid, and optionally a source of lithium, in a solvent to obtain a first cladding layer suspension; mixing the core obtained in the step of providing a core material with the first cladding layer suspension obtained in the first cladding step sufficiently, drying, and sintering to obtain a first cladding layer-clad material;
a second cladding step: dissolving a source of element X, a phosphorus source and an acid in a solvent to obtain a second cladding layer suspension; mixing the first cladding layer-clad material obtained in the first cladding step with the second cladding layer suspension obtained in the second cladding step sufficiently, drying, and sintering to obtain a two cladding layers-clad material;
a third cladding step: fully dissolving a carbon source in a solvent to obtain a third cladding layer solution; then adding the two cladding layers-clad material obtained in the second cladding step to the third cladding layer solution, mixing well, drying and then sintering to obtain a three cladding layers-clad material; and
a fourth cladding step: fully dissolving a polymer in a solvent to obtain a fourth cladding layer solution; then adding the three cladding layers-clad material obtained in the third cladding step to the fourth cladding layer solution, mixing well and drying to obtain a four cladding layers-clad material, i.e., the positive electrode active material.

In some embodiments, the source of element M is one or more of monomers, carbonates, sulfates, chlorates, nitrates, organic acids, oxides, hydroxides of one or more of the respective elements selected from Fe, Ni, Mg, Co, Cu, Zn, Ti, Ag, Zr, Nb, and Al.

In some embodiments, the source of element X is one or more of monomers, carbonates, sulfates, chlorates, nitrates, organic acids, oxides, hydroxides of one or more of the respective elements Li, Fe, Ni, Mg, Co, Cu, Zn, Ti, Ag, Zr, Nb, and Al.

The addition amounts of sources of each of the elements A, R, M, and X depend on the target doping level, and the ratio of the lithium source, manganese sources, and phosphorus source conforms to the stoichiometric ratio.

As an example, the carbon source is one or more of starch, sucrose, glucose, polyvinyl alcohol, polyethylene glycol, and citric acid.

In some embodiments, in the first cladding step, the pH of the solution of the source dissolved with element M, the phosphorus source and acid, and optionally the lithium source, is controlled to be 3.5 to 6.5, and then stirred and reacted for 1 hour to 5 hours, and then the solution is warmed up to 50° C. to 120° C., and maintained at that temperature for 2 hours to 10 hours. In some embodiments, sintering is carried out at 650° C. to 800° C. for 2 hours to 6 hours in the first cladding step.

Optionally, in the first cladding step, the reaction is fully carried out. Optionally, in the first cladding step, the reaction proceeds for about 1.5 hours, about 2 hours, about 3 hours, about 4 hours, about 4.5 hours, or about 5 hours. Optionally, the reaction time of the reaction in the first cladding step may be within any range consisting of any two of the above values.

Optionally, in the first cladding step, the solution pH is controlled to be from 4 to 6. Optionally, in the first cladding step, the solution is warmed to about 55° C., about 60° C., about 70° C., about 80° C., about 90° C., about 100° C., about 110° C., or about 120° C. and held at that temperature for about 2 hours, about 3 hours, about 4 hours, about 5 hours, about 6 hours, about 7 hours, about 8 hours, about 9 hours, or about 10 hours; optionally, the temperature at which the warming occurs and the holding time in the first cladding step may be within any range consisting of any two of the above values.

Optionally, in the first cladding step, the sintering may be carried out at about 650° C., about 700° C., about 750° C., or about 800° C. for about 2 hours, about 3 hours, about 4 hours, about 5 hours, or about 6 hours; optionally, the sintering temperature and the sintering time, may be within any range consisting of any two of the above values.

In the first cladding step, by controlling the sintering temperature and time within the above range, the following can be effectively avoided: if the sintering temperature is too low and the sintering time is too short in the first cladding step, it will result in the first cladding layer having a low degree of crystallinity and more amorphous matter, which will lead to a decrease in the effect of inhibiting the leaching-out of metals, thereby affecting the cycling performance and the high-temperature storage performance of the secondary battery; if the sintering temperature is too high, it will lead to the appearance of heterogeneous phases in the first cladding layer, which will also affect its effect of inhibiting leaching-out of metals, thereby affecting the cycling performance and high-temperature storage performance and the like of the secondary battery; and if the sintering time is too long, it will increase the thickness of the first cladding layer, affecting the migration of $Li^+$, thereby affecting the capacity exertion and the rate performance and the like of the positive electrode active material.

In some embodiments, in the second cladding step, the source of element X, the phosphorus source and the acid are dissolved in a solvent, then stirred and reacted for 1 hour to 10 hours, and then the solution is warmed up to 60° C. to 150° C. and maintained at that temperature for 2 hours to 10 hours. In some embodiments, the sintering in the second cladding step is carried out at 500° C. to 700° C. for 6 hours to 10 hours.

Optionally, in the second cladding step, the reaction is fully carried out. Optionally, in the second cladding step, the reaction proceeds for about 1.5 hours, about 2 hours, about 3 hours, about 4 hours, about 4.5 hours, about 5 hours, about 6 hours, about 7 hours, about 8 hours, about 9 hours, or about 10 hours. Optionally, the reaction time in the second cladding step may be within any range consisting of any two of the above values.

Optionally, in the second cladding step, the solution is warmed to about 65° C., about 70° C., about 80° C., about 90° C., about 100° C., about 110° C., about 120° C., about 130° C., about 140° C., or about 150° C. and maintained at that temperature for about 2 hours, about 3 hours, about 4 hours, about 5 hours, about 6 hours, about 7 hours, about 8 hours, about 9 hours, or about 10 hours; optionally, the temperature at which the warming occurs and the holding time in the second cladding step may be within any range consisting of two any of the above values.

In the step of providing the core material and in the first cladding step and the second cladding step, prior to sintering, i.e., in the preparation of the core material (steps (1)-(2)) in which the chemical reaction takes place as well as in the preparation of the first cladding layer suspension and the second cladding layer suspension, it is possible to avoid the following by selecting the appropriate reaction temperatures and the reaction times, as described above: if the reaction temperature is too low, the reaction cannot occur or the reaction rate is slow; if the temperature is too high, the product decomposes or a heterogeneous phase is formed; if the reaction time is too long, the particle size of the product is large, which may increase the time and difficulty of the subsequent process; and if the reaction time is too short, then the reaction is incomplete and less product is obtained.

Optionally, in the second cladding step, the sintering may be carried out at about 550° C., about 600° C., or about 700° C. for about 6 hours, about 7 hours, about 8 hours, about 9 hours, or about 10 hours; optionally, the sintering temperature and the sintering time may be in any range consisting of any two of the above values.

In the second capping step, by controlling the sintering temperature and time within the above range, the following can be effectively avoided: if the sintering temperature is too low and the sintering time is too short in the second cladding step, it will result in the second cladding layer having a low degree of crystallinity, more amorphous states, and a decline in its performance of lowering the surface reactive activity of the positive electrode active material, thereby affecting the cycling performance and high-temperature storage performance and the like of the secondary battery; if the sintering temperature is too high, it will lead to the appearance of heterogeneous phases in the second cladding layer, which will also affect its effect of lowering the surface reaction activity of the positive electrode active material, thereby affecting the cycling performance and the high-temperature storage performance and the like of the secondary battery; and if the sintering time is too long, it will lead to an increase in the thickness of the second cladding layer, which will affect the voltage plateau of the positive electrode active material, thereby causing a decreased energy density and the like of the secondary battery.

In some embodiments, the sintering in the third cladding step is carried out at 700° C. to 800° C. for 6 hours to 10 hours. Optionally, in the third cladding step, the sintering may be performed at about 700° C., about 750° C., or about 800° C. for about 6 hours, about 7 hours, about 8 hours, about 9 hours, or about 10 hours; optionally, the temperature of the sintering, or the time of the sintering, may be within any range consisting of any two of the above values.

In the third cladding step, by controlling the sintering temperature and time within the above ranges, the following can be effectively avoided: if the sintering temperature in the third cladding step is too low, it will result in a decrease in the degree of graphitization of the third cladding layer, which will affect its electrical conductivity, thereby affecting the capacity exertion of the positive electrode active material; if the sintering temperature is too high, it will result in an excessive degree of graphitization of the third cladding layer, which will affect the $Li^+$ transmission, thereby affecting the exertion and the like of the positive electrode active material; if the sintering time is too short, it will result in the cladding layer being too thin, affecting its electrical conductivity, thereby affecting the capacity exertion of the positive electrode active material; and if the sintering time is too long, it will result in the cladding layer being too thick, affecting the compaction density and the like of the positive electrode active material.

In the above first cladding step, second cladding step, and third cladding step, the drying may all be carried out at a drying temperature of 100° C. to 200° C., optionally 110° C. to 190° C., more optionally 120° C. to 180° C., even more optionally 120° C. to 170° C., and most optionally 120° C. to 160° C., and the drying time may be from 3 hours to 9 hours, optionally 4 hours to 8 hours, more optionally 5 hours to 7 hours, and most optionally about 6 hours.

In the above fourth cladding step, the drying may be carried out at a temperature of 50° C. to 160° C., optionally 60° C. to 150° C., more optionally 70° C. to 140° C., even more optionally 80° C. to 130° C., and most optionally 90° C. to 120° C., the drying time may be 3-9 hours, optionally 4-8 hours, more optionally 5-7 hours, the most optionally about 6 hours.

By the positive electrode active material prepared by the method for preparing the positive electrode active material described in the present application, the secondary battery prepared therefrom has a reduced amount of leaching-out of Mn and Mn-site doping elements after cycling, and the improved high-temperature storage performance, cycling performance, and rate performance. In addition, the raw materials are widely available, low cost and simple process, which is conducive to industrialization.

Positive Electrode Plate

A third aspect of the present application provides a positive electrode plate comprising a positive electrode current collector and a positive electrode film layer provided on at least one surface of the positive electrode current collector, wherein the positive electrode film layer comprises the positive electrode active material of the first aspect of the present application or the positive electrode active material prepared by the method of the second aspect of the present application, and the positive electrode active material is present in the positive electrode film layer in a content of 90 wt % to 99.5 wt %, based on the total weight of the positive electrode film layer. The positive electrode current collector has two surfaces opposite to each other in the direction of its own thickness, and the positive electrode film layer is provided on either or both of two opposite surfaces of the positive electrode current collector.

In some embodiments, the positive electrode active material is present in the positive electrode film layer in a content of 95 wt % to 99.5 wt %, based on the total weight of the positive electrode film layer.

The positive electrode film layer does not exclude other positive electrode active material than the positive electrode active material of the first aspect of the present application or the positive electrode active material prepared by the method of the second aspect of the present application. For example, the positive electrode film may also comprise at least one of a lithium transition metal oxide and a modified compound thereof. By way of example, the other positive electrode active material may include at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof.

In some embodiments, the positive electrode film layer may further comprise a positive conductive agent. In the present application, the type of the positive conductive agent is not particularly limited. As an example, the positive conductive agent comprises at least one of superconducting carbon, conductive graphite, acetylene black, carbon black, Ketjen black, carbon dots, carbon nanotubes, graphene, and carbon nanofibers.

In some embodiments, the positive electrode film layer may further optionally comprise a positive electrode binder. In the present application, the type of the positive electrode binder is not particularly limited. As an example, the positive electrode binder may comprise at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments, the positive electrode current collector may be a metal foil or a composite current collector. As an example of a metal foil, an aluminum foil may be used. The composite current collector may comprise a polymeric material matrix and a metallic material layer formed on at least one surface of the polymeric material matrix. As an example, the metallic material may be selected from at least one of aluminum, aluminum alloy, nickel, nickel alloy, titanium, titanium alloy, silver, and silver alloy. As an example, the polymer material matrix may be selected from polypropylene (PP), polyethylene terephthalate (PET), polybutylene terephthalate (PBT), polystyrene (PS), polyethylene (PE), etc.

The positive electrode film layer is usually made by applying a positive electrode slurry to the positive electrode current collector followed by drying and cold pressing. The positive electrode slurry is usually formed by dispersing the positive electrode active material, an optional conductive agent, an optional binder, and any other components in a solvent and stirring uniformly. The solvent may be N-methylpyrrolidone (NMP), but is not limited thereto.

Secondary Battery

A fourth aspect of the present application provides a secondary battery comprising the positive electrode plate of the third aspect of the present application.

A secondary battery, also known as a rechargeable battery or accumulator, is a battery that can continue to be used by activating its active material by means of charging after the battery has been discharged. Typically, a secondary battery includes an electrode assembly and an electrolyte, and the electrode assembly includes a positive electrode plate, a negative electrode plate, and a separator. The separator is disposed between the positive electrode plate and the negative electrode plate, which mainly functions as preventing short circuit of the positive and negative electrodes and at the same time allowing active ions to pass through. The electrolyte functions as conducting active ions between the positive electrode plate and the negative electrode plate.

[Positive Electrode Plate]

A positive electrode plate used in the secondary battery of this application is the positive electrode plate described in any one of embodiments of the third aspect of this application.

[Negative Electrode Plate]

In some embodiments, the negative electrode plate comprises a negative electrode current collector and a negative electrode film layer provided on at least one surface of the negative electrode current collector and comprising a negative electrode active material. For example, the negative electrode current collector has two surfaces opposite to each other in the direction of its own thickness, and the negative electrode film layer is provided on either or both of two opposite surfaces of the negative electrode current collector.

The negative electrode active material may be a negative electrode active material known in the art for use in the secondary battery. By way of example, the negative electrode active material includes, but is not limited to, at least one of natural graphite, artificial graphite, soft carbon, hard carbon, silicon-based material, tin-based material, and lithium titanate. The silicon-based material may include at least one of elemental silicon, a silicon oxide, a silicon carbon composite, a silicon nitrogen composite, a silicon alloy material. The tin-based materials may include at least one of elemental tin, a tin oxide, and a tin alloy material. The present application is not limited to these materials, and other conventionally known materials that can be used as negative electrode active materials for the secondary battery may also be used. These negative electrode active materials can be used alone, or in combination of two or more materials.

In some embodiments, the negative electrode film layer may also optionally comprise a negative conductive agent. In the present application, the type of the negative conductive agent is not particularly limited and, as an example, the negative conductive agent may include at least one of superconducting carbon, conductive graphite, acetylene black, carbon black, Ketjen black, carbon dots, carbon nanotubes, graphene, and carbon nanofibers.

In some embodiments, the negative electrode film layer may further optionally comprise a negative electrode binder. In the present application, the type of the negative electrode binder is not particularly limited and, as an example, the negative electrode binder may include at least one of styrene-butadiene rubber (SBR), water-soluble unsaturated resin SR-1B, aqueous acrylic resins (e.g., polyacrylic acid PAA, polymethacrylic acid PMAA, polyacrylic acid sodium salt PAAS), polyacrylamide (PAM), polyvinyl alcohol (PVA), sodium alginate (SA), and carboxymethyl chitosan (CMCS).

In some embodiments, the negative electrode film layer may optionally also include other additives. As an example, the other additives may include thickeners, e.g., sodium carboxymethyl cellulose (CMC), and PTC thermistor material, etc.

In some embodiments, the negative electrode current collector may be a metal foil or a composite current collector. As an example of a metal foil, a copper foil may be used. The composite current collector may include a polymeric material matrix and a metallic material layer formed on at least one surface of the polymeric material matrix. As an example, the metallic material may be selected from at least one of copper, copper alloy, nickel, nickel alloy, titanium, titanium alloy, silver, and silver alloy. As an example, the polymer material matrix may be selected from polypropylene (PP), polyethylene terephthalate (PET), polybutylene terephthalate (PBT), polystyrene (PS), polyethylene (PE), etc.

The negative electrode film layer is usually made by applying a negative electrode slurry to the negative electrode current collector followed by drying and cold pressing. The negative electrode slurry is usually formed by dispersing the negative active material, an optional conductive agent, an optional binder, and any other optional additives in a solvent and stirring uniformly. The solvent may be N-methylpyrrolidone (NMP) and deionized water, but is not limited thereto.

The negative electrode plate does not exclude other additional functional layers than the negative electrode film layer. For example, in some embodiments, the negative electrode plate described in the present application further comprises a conductive primer (e.g. being composed of a conductive agent and a binder) sandwiched between the negative electrode current collector and the negative electrode film layer and disposed on the surface of the negative electrode current collector. In some other embodiments, the negative electrode plate described in this application further comprises a protective layer cladding the surface of the negative electrode film layer.

[Electrolyte]

The type of electrolyte is not specifically restricted in the present application, and can be selected by those skilled in the art according to actual requirements. For example, the electrolyte may be at least one selected from solid electrolyte and liquid electrolyte (i.e., electrolytic solution).

In some embodiments, an electrolytic solution is used as the electrolyte. The electrolytic solution includes an electrolyte salt and a solvent.

The type of electrolyte salt is not specifically restricted in the present application, and can be selected by those skilled in the art according to actual requirements. In some embodiments, as an example, the electrolyte salt may comprise at least one of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bis(trifluoromethane sulfonimide) (LiTFSI), lithium trifluoromethane sulfonate (LiTFS), lithium difluorooxalate borate (LiDFOB), lithium dioxalate borate (LiBOB), lithium difluorophosphate (LiPO$_2$F$_2$), lithium difluorodioxalate phosphate (LiDFOP) and lithium tetrafluorooxalate phosphate (LiTFOP).

The type of solvent is not specifically restricted in the present application, and can be selected by those skilled in the art according to actual requirements. In some embodiments, the solvent may comprise at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolytic solution may also optionally include additives. For example, the additives may include negative electrode film-forming additives, and may include positive electrode film-forming additives, and yet may include additives that can improve certain performances of battery, for example, additives that improve battery overcharge performance, additives that improve high-temperature performance of battery, and additives that improve low-temperature performance of battery.

[Separator]

In the secondary battery using an electrolytic solution and some secondary battery using a solid electrolyte, separators may be further included. The separators are arranged between the positive electrode plate and the negative electrode plate, and mainly function as preventing short circuit of the positive and negative electrodes while allowing active ions to pass through. There is no particular limitation on the type of separator in the present application, and any well-known porous-structure separator with good chemical stability and mechanical stability may be used.

In some embodiments, materials of the separator may be at least one of glass fibers, non-woven fabrics, polyethylene, polypropylene and polyvinylidene fluoride. The separator may be a single-layer film or a multi-layer composite film. When the separator is a multi-layer composite film, materials of each layer may be the same or different.

In some embodiments, the positive electrode plate, the separator, and the negative electrode plate may be made into an electrode assembly by a winding process or a stacking process.

In some embodiments, the secondary battery may include an outer package. The outer package may be used to encapsulate the electrode assembly and electrolyte.

In some embodiments, the outer package of the secondary battery may be a hard case, such as a hard plastic case, an aluminum case, a steel case, and the like. The outer package of the secondary battery may also be a soft package, such as a pouch-type soft package. The material of the soft bag can be plastic, such as at least one of polypropylene (PP), polybutylene terephthalate (PBT), and polybutylene succinate (PBS).

The present application does not have particular limitation on the shape of the secondary battery. The secondary battery may be cylindrical, cuboid, or in other arbitrary shape. FIG. 1 shows a secondary battery 5 with a square structure as an example.

Figure 2:
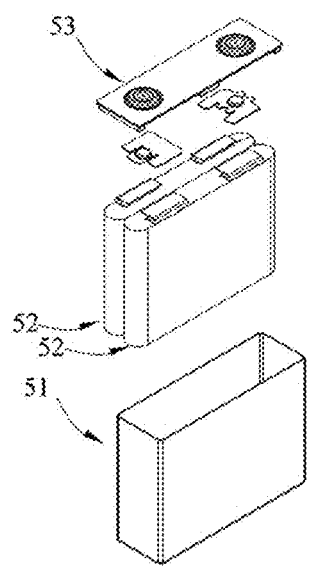
FIG. 2 is an exploded view of a secondary battery according to an embodiment of the present application shown in FIG. 1.

In some embodiments, referring to FIG. 2, the outer package may include a housing 51 and a cover plate 53. The housing 51 may include a bottom plate and side plates connected to the bottom plate, and the bottom plate and the side plates enclose a receiving cavity. The housing 51 has an opening communicated with the receiving cavity, and the cover plate 53 can cover the opening to close the receiving cavity. The positive electrode plate, the negative electrode plate and the separator may be wound or stacked to form an electrode assembly 52, which is encapsulated in the receiving cavity. The electrolytic solution is infiltrated into the electrode assembly 52. The number of electrode assemblies 52 contained in the secondary battery 5 may be one or more, which may be adjusted according to the demand.

The method for preparing the secondary battery of the present application is well known. In some embodiments, a positive electrode plate, a separator, a negative electrode plate, and an electrolytic solution may be assembled to form a secondary battery. As an example, a positive electrode plate, a separator, and a negative electrode plate can be made into an electrode assembly by a winding process or a stacking process, and the electrode assembly can be placed in an outer package and is subjected to drying, to which an electrolytic solution is injected. After vacuum encapsulation, resting, chemical formation, and shaping process, a secondary battery can be obtained.

In some embodiments of the present application, the secondary battery according to the present application can be assembled into a battery module, and the number of secondary battery contained in the battery modules can be more than one, and the specific number can be adjusted according to application and capacity of the battery module.

Figure 3:
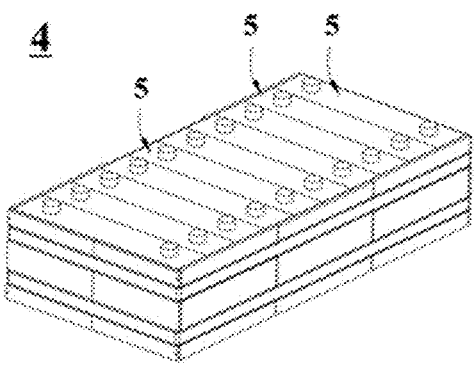
FIG. 3 is a schematic diagram of a battery module according to an embodiment of the present application.

FIG. 3 is a schematic diagram of the battery module 4 as an example. As shown in FIG. 3, in the battery module 4, a plurality of secondary batteries 5 may be arranged in sequence along the longitudinal direction of the battery module 4. Certainly, they can also be arranged in any other manner. Furthermore, a plurality of secondary batteries 5 can be fixed with fasteners.

Optionally, the battery module 4 may further include a housing having an accommodating space in which a plurality of secondary batteries 5 are accommodated.

In some embodiments, the above-mentioned battery modules can also be assembled into a battery pack, and the number of battery modules included in the battery pack can be adjusted according to the application and capacity of the battery pack.

Figure 4:
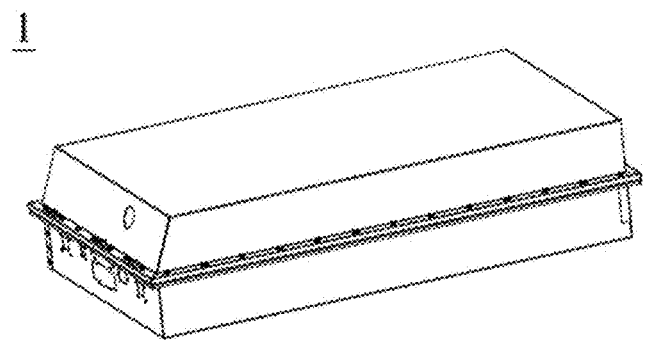
FIG. 4 is a schematic diagram of a battery pack according to an embodiment of the present application.
Figure 5:
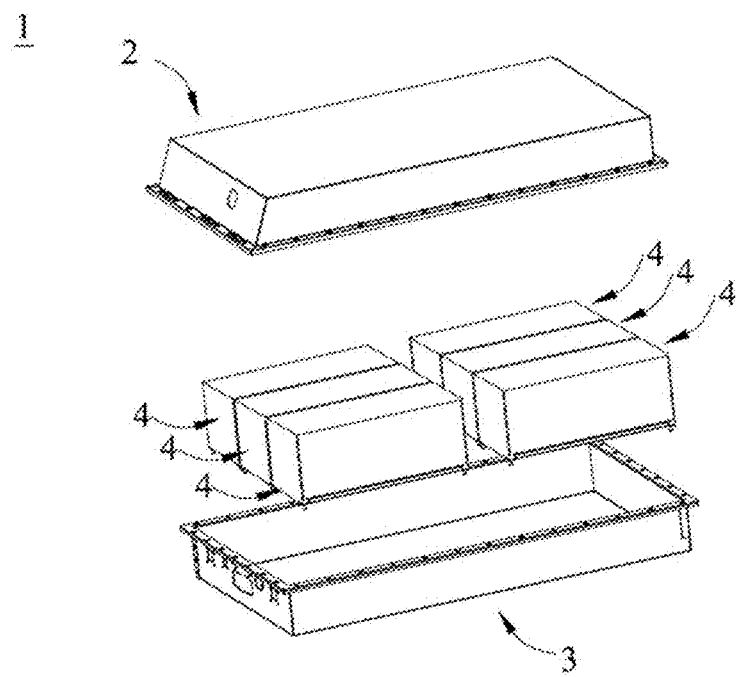
FIG. 5 is an exploded view of the battery pack according to an embodiment of the present application as shown in FIG. 4.

FIGS. 4 and 5 are schematic diagrams of the battery pack 1 as an example. As shown in FIGS. 4 and 5, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

A fifth aspect of the present application provides an electrical device comprising at least one of the secondary battery, battery module, and battery pack of the present application. The secondary battery, battery module or battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The electrical device can select a secondary battery, a battery module or a battery pack according to its usage requirements.

Figure 6:
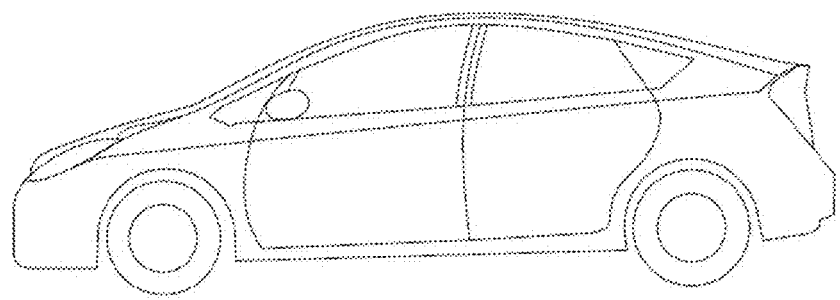
FIG. 6 is a schematic diagram of an electrical device according to an embodiment of the present application using the secondary battery of the present application as power source.

FIG. 6 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used.

As another example, the electrical device may be a mobile phone, a tablet computer, a notebook computer, and the like. The electric device is generally required to be light and thin, and a secondary battery can be used as a power source.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, and all reagents used in the examples are commercially available or synthesized according to conventional methods and can be directly used without further treatment, and all instruments used in the examples are commercially available.

The sources of raw materials involved in examples of the present application are as follows:

| Name | Chemical Formula | Supplier | Specification |
|---|---|---|---|
| Manganese Carbonate | $MnCO_3$ | Shandong West Asia Chemical Industry Co. | 1 Kg |
| Lithium Carbonate | $Li_2CO_3$ | Shandong West Asia Chemical Industry Co. | 1 Kg |
| Magnesium carbonate | $MgCO_3$ | Shandong West Asia Chemical Industry Co. | 1 Kg |
| Zinc Carbonate | $ZnCO_3$ | Wuhan Xinru Chemical Co. | 25 Kg |
| Ferrous | $FeCO_3$ | Xi'an Lanzhiguang | 1 Kg |

-continued

| Name | Chemical Formula | Supplier | Specification |
|---|---|---|---|
| Carbonate | | FineMaterial Co. | |
| Nickel Sulfate | $NiCO_3$ | Shandong West Asia Chemical Industry Co. | 1 Kg |
| Titanium Sulfate | $Ti(SO_4)_2$ | Shandong West Asia Chemical Industry Co. | 1 Kg |
| Cobalt Sulfate | $CoSO_4$ | Xiamen Zhixin Chemical Co. | 500 g |
| Vanadium Dichloride | $VCl_2$ | Shanghai Jin Jin Le Industry Co. | 1 Kg |
| Oxalic acid dihydrate | $C_2H_2O_4 \cdot 2(H_2O)$ | Shanghai Jin Jin Le Industry Co. | 1 Kg |
| Ammonium dihydrogen phosphate | $NH_4H_2PO_4$ | Shanghai Chengshao Biotechnology Co. | 500 g |
| Sucrose | $C_{12}H_{22}O_{11}$ | Shanghai Yuanye Biotechnology Co. | 100 g |
| Dilute sulfuric acid | $H_2SO_4$ | Shenzhen Haisian Biotechnology Co. | In a mass percentage of 60% |
| Dilute nitric acid | $HNO_3$ | Anhui Lingtian Fine Chemical Co. | In a mass percentage of 60% |
| Metasilicic acid | $H_2SiO_3$ | Shanghai Yuanye Biotechnology Co. | 100 g, in a mass percentage of 99.8% |

I. Preparation of Battery

Example 1

Step 1: Preparation of Positive Electrode Active Material
Step S1: Preparation of Manganese Oxalate Co-Doped with Fe, Co, V and S 689.6 g of manganese carbonate, 455.27 g of ferrous carbonate, 4.65 g of cobalt sulfate and 4.87 g of vanadium dichloride were added to a mixer and mixed thoroughly for 6 hours. Then the mixture was transferred to a reaction kettle, and 5 L of deionized water and 1260.6 g of oxalic acid dehydrate were added. The reaction kettle was heated to 80° C. and stirred thoroughly at 500 rpm for 6 hours to mix homogeneously, until the reaction terminated without generation of bubbles, to obtain a suspension of manganese oxalate suspension co-doped with Fe, Co, and V. Then the suspension was filtered, and the resulting filter cake was dried at 120° C., after which it was ground to obtain particles of manganese oxalate with a particle size of 100 nm.
Step S2: Preparation of Core $Li_{0.997}Mn_{0.60}Fe_{0.393}V_{0.004}Co_{0.003}P_{0.997}S_{0.003}O_4$ 1793.1 g of manganese oxalate prepared in step S1, 368.3 g of lithium carbonate, 1146.6 g of ammonium dihydrogen phosphate and 4.9 g of dilute sulfuric acid were added to 20 L of deionized water, stirred thoroughly, and mixed thoroughly at 80° C. for 10 hours to obtain a slurry. The slurry was transferred to the spray drying equipment for spray drying granulation, and dried at a temperature of 250° C. to obtain a powder. The power was sintered in a roller kiln at 700° C. for 4 hours in a protective atmosphere (90% nitrogen and 10% hydrogen) to obtain the above core material.
Step S3: Preparation of the First Cladding Layer Suspension $Li_2FeP_2O_7$ solution was prepared by dissolving 7.4 g of lithium carbonate, 11.6 g of ferrous carbonate, 23.0 g of ammonium dihydrogen phosphate, and 12.6 g of oxalic acid dihydrate in 500 mL of deionized water, controlling the pH to be 5, and then stirred and reacted for 2 hours at room temperature to obtain the solution, after which the solution was warmed up to 80° C. and kept at this temperature for 4 hours to obtain the first cladding layer suspension.
Step S4: Cladding of the First Cladding Layer 1571.9 g of the core material of doped lithium manganese phosphate obtained in step S2 was added to the first cladding layer suspension (with a content of cladding material of 15.7 g) obtained in step S3, and mixed with sufficient stirring for 6 hours, and after mixing well, transferred to an oven at 120° C. for drying for 6 hours, and then sintered at 650° C. for 6 hours to obtain the pyrophosphate-clad material.
Step S5: Preparation of the Second Cladding Layer Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, and then stirred and reacted for 6 hours to obtain a solution, and then the solution was warmed up to 120° C. and kept at this temperature for 6 hours to obtain the second cladding layer suspension.
Step S6: Cladding of the Second Cladding Layer 1586.8 g of the pyrophosphate-clad material obtained in Step S4 was added to the second cladding layer suspension (with a content of cladding material of 47.1 g) obtained in Step S5, and mixed with thorough stirring for 6 hours, and after the mixture was homogeneous, it was transferred to an oven at 120° C. for drying for 6 hours, and then sintered at 700° C. for 8 hours to obtain the two-layer clad material.
Step S7: Preparation of the Aqueous Solution of the Third Cladding Layer 37.3 g of sucrose was dissolved in 500 g of deionized water, then stirred and fully dissolved to obtain an aqueous solution of sucrose.
Step S8: Cladding of the Third Cladding Layer 1633.9 g of the two-layer clad material obtained in Step S6 was added to the sucrose solution obtained in Step S7, stirred and mixed for 6 hours, and after mixing uniformly, transferred to an oven at 150° C. to dry for 6 hours, and then sintered at 700° C. for 10 hours to obtain the three-layer clad material.
Step S9: Preparation of Aqueous Solutions of the Fourth Cladding Layer 15.7 g of carboxymethyl chitosan was dissolved in 1000 g of deionized water and then stirred and fully dissolved to obtain a polysaccharide solution.
Step S10: Cladding of the Fourth Cladding Layer 1649.6 g of the three-layer clad material obtained in step S8 was added to the polysaccharide solution obtained in step S9, stirred and mixed for 6 hours, and after mixing uniformly, transferred to an oven at 120° C. to dry for 4 hours, to obtain the positive electrode active material. The mass percentage of the substituent attached to the sugar unit in carboxymethyl chitosan is 60.2%, the number average molecular weight is 26000, and the cladding amount is 1 wt %, based on the weight of the core.
Step 2: Preparation of Positive Electrode Plate The four-layer clad positive electrode active material, acetylene black as a conductive agent, polyvinylidene difluoride (PVDF) as a binder at a weight ratio of 97.0:1.2:1.8 were added to N-methylpyrrolidone (NMP), stirred and mixed thoroughly to obtain a positive electrode slurry. The positive electrode slurry was then uniformly applied to an aluminum foil at 0.280 g/1540.25 mm$^2$, and then dried, cold pressed, and slit to obtain a positive electrode plate.
Step 3: Preparation of Negative Electrode Plate Artificial graphite as a negative active material, hard carbon, acetylene black as a conductive agent, styrene butadiene rubber (SBR) as a binder, sodium carboxymethyl cellulose (CMC) as a thickener at a weight ratio of 90:5:2:2:1 were dissolved in a solvent deionized water, which was stirred and mixed thoroughly to prepare a negative electrode slurry. The negative electrode slurry was uniformly applied to a copper foil as a current collector at 117 g/1540.25 mm², and then dried, cold pressed, and slit to obtain a negative electrode plate.

Step 4: Preparation of Electrolytic Solution

In an argon atmosphere glove box ($H_2O<0.1$ ppm, $O_2<0.1$ ppm), the organic solvent ethylene carbonate (EC)/ethyl methyl carbonate (EMC) was mixed thoroughly in accordance with the volume ratio of 3/7, and 12.5 wt % (based on the weight of the solvent of ethylene carbonate/ethyl methyl carbonate) of $LiPF_6$ was added to dissolve in the organic solvent mentioned above, and stirred homogeneously, to obtain the electrolytic solution.

Step 5: Preparation of Separator

A commercially available PP-PE copolymer microporous film with a thickness of 20 m and an average pore size of 80 nm was used (from JOCO Electronic Technology Company, model 20).

Step 6: Preparation of Full Battery

The resulting positive electrode plate, separator and negative electrode plate were stacked in order, so that the separator was sandwiched between the positive and negative electrodes for isolation, and then they were wound to form an electrode assembly. The electrode assembly was placed in an outer package, filled with the above electrolytic solution, and encapsulated to obtain a full battery.

[Preparation of Button Battery]

The positive electrode active material, polyvinylidene difluoride (PVDF), and acetylene black at a weight ratio of 90:5:5 were added to N-methylpyrrolidone (NMP) and stirred in a drying room to make a slurry. The above slurry was applied to an aluminum foil, dried and cold pressed to form a positive electrode plate. The cladding amount was 0.2 g/cm² and the compaction density was 2.0 g/cm³.

Lithium sheet was used as a negative electrode, a 1 mol/L solution of $LiPF_6$ in a 1:1:1 volume ratio of ethylene carbonate (EC), diethyl carbonate (DEC) and dimethyl carbonate (DMC) was used as an electrolytic solution, and they were assembled together with the above prepared positive electrode plate in a button battery box to form a button battery (hereinafter also referred to as "button").

Examples 2-29 and Comparative Examples 1-18

The positive electrode active material and battery in Examples 2-29 and Comparative Examples 1-18 were prepared in a similar manner to that in example 1, with differences described in Tables 1-6 in the preparation of positive electrode active material. In Comparative examples 1-2, 4-10 and 12, the first cladding layer was not applied, and thus there were no steps S3 and S4; in Comparative Examples 1-11, the second cladding layer was not applied, and thus there were no steps S5 and S6; in Comparative Examples 1-18, the fourth cladding layer was not applied, and thus there were no steps S9 and S10; the applied amounts of the fourth cladding layer in Examples 2 to 4 were 2 wt % (the mass of carboxymethyl chitosan was 31.4 g), 5 wt % (the mass of carboxymethyl chitosan was 78.5 g), and 8 wt % (the mass of carboxymethyl chitosan was 125.6 g), respectively, based on the weight of the core material; and the applied amounts of the fourth cladding layer in Examples 8 to 10 were 2 wt % (the mass of the carboxymethyl chitosan was 31.4 g), based on the weight of the core material.

Examples 30-42

Examples 30-42 were carried out in a similar manner to Example 1, with differences described in Tables 7 and 8 below.

Examples 43-52

Examples 43-52 were carried out in a similar manner to Example 1, with differences described in Table 9 below. The carboxymethyl chitosan in Example 1 was replaced with hydroxyethyl cellulose (the substituent attached to the sugar unit was present in a mass percentage of 45.9%, the number average molecular weight is 59800), carboxymethyl cellulose (the substituent attached to the sugar unit is present in a mass percentage of 53.3%, the number average molecular weight is 90000), guar gum (the substituent attached to the sugar unit is present in a mass percentage of 38.0%, the number average molecular weight is 30400), hydroxypropyl starch (the substituent attached to the sugar unit is present in a mass percentage of 40.8%, the number average molecular weight is 47300), sodium alginate (the substituent attached to the sugar unit is present in a mass percentage of 44.0%, the number average molecular weight is 18000), fucoidan (the substituent attached to the sugar unit is present in a mass percentage of 42.4%, the number average molecular weight is 23000), agar (the substituent attached to the sugar unit is present in a mass percentage of 39.0%, the number average molecular weight is 26800), carrageenan (the substituent attached to the sugar unit is present in a mass percentage of 62.3%, the number average molecular weight is 32000), carboxymethyl chitosan (the substituent attached to the sugar unit is present in a mass percentage of 15.0%, the number average molecular weight is 112000), carboxymethyl chitosan (the substituent attached to the sugar unit is present in a mass percentage of 90.0%, the number average molecular weight is 76400) in Examples 43-52, respectively.

Examples 53-57

Examples 53-57 were carried out in a similar manner to Example 1, with differences described in Table 9 below. The cladding amount of carboxymethyl chitosan in Example 1 was replaced with 0.1 wt % (the mass of the carboxymethyl chitosan is 1.6 g), 2 wt % (the mass of the carboxymethyl chitosan is 31.4 g), 5 wt % (the mass of the carboxymethyl chitosan is 78.5 g), 10 wt % (the mass of the carboxymethyl chitosan is 157.1 g), 12 wt % (the mass of the carboxymethyl chitosan is 188.4 g), based on the weight of core material, in Examples 53-57, respectively.

Examples 58-64

Examples 58-64 were carried out in a similar manner to Example 1, with differences described in Table 9 below. The number average molecular weight of carboxymethyl chitosan in Example 1 was replaced with 10000 (the substituent attached to the sugar unit is present in a mass percentage of 61.3%), 20000 (the substituent attached to the sugar unit is present in a mass percentage of 60.8%), 50000 (the substituent attached to the sugar unit is present in a mass percentage of 58.2%) and 80000 (the substituent attached to the sugar unit is present in a mass percentage of 56.8%), 120000 (the substituent attached to the sugar unit is present in a mass percentage of 55.7%), 200000 (the substituent attached to the sugar unit is present in a mass percentage of 55.1%), and 300000 (the substituent attached to the sugar unit is present in a mass percentage of 54.9%) in Examples 58-64, respectively.

In addition, in all Examples and Comparative Examples of the present application, if not indicated, the materials of the first cladding layer and/or the second cladding layer used are crystalline.

TABLE 1

The raw materials for preparing the core

| NO. | Core | Raw materials used in Step S1 | Raw materials used in Step S2 |
|---|---|---|---|
| Comparative Examples 1 and 13 | $LiMnPO_4$ | Manganese carbonate, 1149.3 g; water, 5 L; oxalic acid dehydrate, 1260.6 g | Manganese oxalate dihydrate (as $C_2O_4Mn \cdot 2H_2O$) obtained in Step S1, 1789.6 g; lithium carbonate, 369.4 g; ammonium dihydrogen phosphate, 1150.1 g; water, 20 L |
| Comparative Example 2 | $LiMn_{0.60}Fe_{0.40}PO_4$ | Manganese carbonate, 689.6 g; ferrous carbonate, 463.4 g; water 5 L; oxalic acid dehydrate, 1260.6 g | Ferromanganese oxalate dihydrate (as $C_2O_4Mn_{0.60}Fe_{0.40} \cdot 2H_2O$) obtained in Step S1, 1793.2 g; lithium carbonate, 369.4 g; ammonium dihydrogen phosphate, 1150.1 g; water, 20 L |
| Comparative Example 3 | $LiMn_{0.80}Fe_{0.20}PO_4$ | Manganese carbonate, 919.4 g; ferrous carbonate, 231.7 g; water, 5 L; oxalic acid dehydrate, 1260.6 g | Ferromanganese oxalate dihydrate (as $C_2O_4Mn_{0.80}Fe_{0.20} \cdot 2H_2O$) obtained in Step S1, 1791.4 g; lithium carbonate, 369.4 g; ammonium dihydrogen phosphate, 1150.1 g; water, 2 0L |
| Comparative Example 4 | $LiMn_{0.70}Fe_{0.295}V_{0.005}PO_4$ | Manganese carbonate, 804.5 g; ferrous carbonate, 341.8 g; vanadium dichloride, 6.1 g; water, 5 L; oxalic acid dehydrate, 1260.6 g | Ferromanganese vanadium oxalate dihydrate (as $C_2O_4Mn_{0.70}Fe_{0.295}V_{0.005} \cdot 2H_2O$) obtained in Step S1, 1792.0 g; lithium carbonate, 369.4 g; ammonium dihydrogen phosphate, 1150.1 g; water, 20 L |
| Comparative Examples 5 and 15 | $LiMn_{0.60}Fe_{0.395}Mg_{0.005}PO_4$ | Manganese carbonate, 689.6 g; ferrous carbonate, 457.6 g; magnesium carbonate, 4.2 g; water, 5 L; oxalic acid dihydrate, 1260.6 g | Ferromanganese magnesium oxalate dihydrate (as $C_2O_4Mn_{0.60}Fe_{0.395}Mg_{0.005} \cdot 2H_2 0$) obtained in Step S1, 1791.6 g; lithium carbonate, 369.4 g; ammonium dihydrogen phosphate, 1150.1 g; water, 2 0L |
| Comparative Example 6 | $LiMn_{0.60}Fe_{0.35}Ni_{0.05}PO_4$ | Manganese carbonate, 689.6 g; ferrous carbonate, 405.4 g; nickel carbonate, 59.3 g; water, 5 L; oxalic acid dihydrate, 1260.6 g | Ferromanganese nickel oxalate dihydrate (as $C_2O_4Mn_{0.60}Fe_{0.35}Ni_{0.05} \cdot 2H_2O$) obtained in Step S1, 1794.6 g; lithium carbonate, 369.4 g; ammonium dihydrogen phosphate, 1150.1 g; water, 20 L |
| Comparative Examples 7 and 9 | $LiMn_{0.60}Fe_{0.395}V_{0.002}Ni_{0.003}PO_4$ | Manganese carbonate, 689.6 g; ferrous carbonate, 457.6 g; vanadium dichloride, 2.4 g; nickel carbonate, 3.6 g; water, 5 L; oxalic acid dihydrate, 1260.6 g | Ferromanganese vanadium nickel oxalate dihydrate (as $C_2O_4Mn_{0.60}Fe_{0.395}V_{0.002}Ni_{0.003} \cdot 2H_2O$) obtained in Step S1, 1793.2 g; lithium carbonate, 369.4 g; ammonium dihydrogen phosphate, 1150.1 g; water, 20 L |
| Comparative Example 8 | $LiMn_{0.60}Fe_{0.395}V_{0.002}Mg_{0.003}PO_4$ | Manganese carbonate, 689.6 g; ferrous carbonate, 457.6 g; vanadium dichloride, 2.4 g; magnesium carbonate, 2.53 g; water, 5 L; oxalic acid dihydrate, 1260.6 g | Ferromanganese vanadium magnesium oxalate dihydrate (as $C_2O_4Mn_{0.60}Fe_{0.395}V_{0.002}Mg_{0.003} \cdot 2H_2O$) obtained in Step S1, 1792.1 g; lithium carbonate, 369.4 g; ammonium dihydrogen phosphate, 1150.1 g; water, 20 L |
| Comparative Examples 10-12 and | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, | Ferromanganese vanadium cobalt oxalate dihydrate (as $C_2O_4Mn_{0.60}Fe_{0.393}V_{0.004}Co_{0.003} \cdot 2H_2O$) obtained in Step S1, 1793.1 g; lithium carbonate, |

TABLE 1-continued

| NO. | Core | Raw materials used in Step S1 | Raw materials used in Step S2 |
|---|---|---|---|
| Comparative Examples 16-18 and Examples 1-10 | | 4.9 g; water, 5 L; oxalic acid dihydrate, 1260.6 g | 368.3 g; ammonium dihydrogen phosphate, 1146.6 g; dilute sulfuric acid, 4.9 g; water, 20 L |
| Comparative Example 14 | $Li_{1.2}MnP_{0.8}Si_{0.2}O_4$ | Manganese carbonate, 1149.3 g; water, 5 L; oxalic acid dihydrate, 1260.6 g | manganese oxalate dihydrate (as $C_2O_4Mn \cdot 2H_2O$) obtained in Step S1, 1789.6 g; lithium carbonate, 443.3 g; ammonium dihydrogen phosphate, 920.1 g; metasilicic acid, 156.2 g; water, 20 L |
| Example 11 | $Li_{1.001}Mn_{0.60}Fe_{0.393}V_{0.004}Co_{0.003}P_{0.999}Si_{0.00104}$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | Ferromanganese vanadium cobalt oxalate dihydrate (as $C_2O_4Mn_{0.60}Fe_{0.393}V_{0.004}Co_{0.003} \cdot 2H_2O$) obtained in Step S1, 1793.1 g; lithium carbonate, 369.8 g; ammonium dihydrogen phosphate, 1148.9 g; metasilicic acid, 0.8 g; water, 20 L |
| Example 12 | $LiMn_{0.60}Fe_{0.393}V_{0.004}Co_{0.003}P_{0.998}N_{0.00204}$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | Ferromanganese vanadium cobalt oxalate dihydrate (as $C_2O_4Mn_{0.60}Fe_{0.393}V_{0.004}Co_{0.003} \cdot 2H_2O$) obtained in Step S1, 1793.1 g; lithium carbonate, 369.4 g; ammonium dihydrogen phosphate, 1147.8 g; dilute nitric acid, 2.7 g; water, 20 L |
| Example 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g | Ferromanganese vanadium cobalt oxalate dihydrate (as $C_2O_4Mn_{0.65}Fe_{0.341}V_{0.004}Co_{0.005} \cdot 2H_2O$) obtained in Step S1, 1792.7 g; lithium carbonate, 367.6 g; ammonium dihydrogen phosphate, 1144.3 g; dilute sulfuric acid, 8.2 g; water, 20 L |
| Example 14 | $Li_{1.002}Mn_{0.70}Fe_{0.293}V_{0.004}Co_{0.003}P_{0.998}Si_{0.00204}$ | Manganese carbonate, 804.6 g; ferrous carbonate, 339.5 g; cobalt sulfate, 4.7 g; vanadium dichloride, 4.9 g; water, 5 L; oxalic acid dihydrate, 1260.6 g | Ferromanganese vanadium cobalt oxalate dihydrate (as $C_2O_4Mn_{0.70}Fe_{0.293}V_{0.004}Co_{0.003} \cdot 2H_2O$) obtained in Step S1, 1792.2 g; lithium carbonate, 370.2 g; 1147.8; metasilicic acid, 1.6 g; water, 20 L |
| Examples 15 and 17 | $LiMn_{0.60}Fe_{0.393}V_{0.004}Co_{0.003}P_{0.999}N_{0.00104}$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | Ferromanganese vanadium cobalt oxalate dihydrate (as $C_2O_4Mn_{0.60}Fe_{0.393}V_{0.004}Co_{0.003} \cdot 2H_2O$) obtained in Step S1, 1793.1 g; lithium carbonate, 369.4 g; ammonium dihydrogen phosphate, 1148.9 g; dilute sulfuric acid, 1.4 g; water, 20 L |
| Example 16 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g | Ferromanganese vanadium cobalt oxalate dihydrate (as $C_2O_4Mn_{0.60}Fe_{0.393}V_{0.004}Co_{0.003} \cdot 2H_2O$) obtained in Step S1, 1793.1 g; lithium carbonate, 368.7 g; ammonium dihydrogen phosphate, 1146.6 g; dilute sulfuric acid, 4.9 g; water, 20 L |
| Example 18 | $LiMn_{0.60}Fe_{0.393}V_{0.004}Mg_{0.003}P_{0.995}N_{0.00504}$ | Manganese carbonate, 689.6 g; ferrous carbonate, 455.3 g; magnesium carbonate, 2.5 g; vanadium dichloride, 4.9 g; water, 5 L; oxalic acid | Ferromanganese vanadium magnesium oxalate dihydrate (as $C_2O_4Mn_{0.60}Fe_{0.393}V_{0.004}Mg_{0.003} \cdot 2H_2O$) obtained in Step S1, 1791.1 g; lithium carbonate, 369.4 g; |

TABLE 1-continued

| | | The raw materials for preparing the core | |
|---|---|---|---|
| NO. | Core | Raw materials used in Step S1 | Raw materials used in Step S2 |
| | | dihydrate, 1260.6 g | ammonium dihydrogen phosphate, 1144.3 g; dilute sulfuric acid, 7.0 g; water, 20 L |
| Example 19 | $Li_{0.999}Mn_{0.60}Fe_{0.393}V_{0.004}Mg_{0.003}P_{0.999}S_{0.00104}$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g | Ferromanganese vanadium magnesium oxalate dihydrate (as $C_2O_4Mn_{0.60}Fe_{0.393}V_{0.004}Mg_{0.003} \cdot 2H_2O$) obtained in Step S1, 1791.1 g; lithium carbonate, 369.0 g; ammonium dihydrogen phosphate, 1148.9 g; dilute sulfuric acid, 1.6 g; water, 20 L |
| Example 20 | $Li_{0.998}Mn_{0.60}Fe_{0.393}V_{0.004}Ni_{0.003}P_{0.998}S_{0.00204}$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g | Ferromanganese vanadium nickel oxalate dihydrate (as $C_2O_4Mn_{0.60}Fe_{0.393}V_{0.004}Ni_{0.003} \cdot 2H_2O$) obtained in Step S1, 1792.2 g; lithium carbonate, 368.7 g; ammonium dihydrogen phosphate, 1147.8 g; dilute sulfuric acid, 3.2 g; water, 20 L |
| Examples 21-24 | $Li_{1.001}Mn_{0.60}Fe_{0.393}V_{0.004}Ni_{0.003}P_{0.999}Si_{0.00104}$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g | Ferromanganese vanadium nickel oxalate dihydrate (as $C_2O_4Mn_{0.60}Fe_{0.393}V_{0.004}Ni_{0.003} \cdot 2H_2O$) obtained in Step S1, 1793.1 g; lithium carbonate, 369.8 g; ammonium dihydrogen phosphate, 1148.9 g; metasilicic acid, 0.8 g; water, 20 L |
| Example 25 | $Li_{1.001}Mn_{0.50}Fe_{0.493}V_{0.004}Ni_{0.003}P_{0.999}Si_{0.00104}$ | Manganese carbonate, 574.7 g; ferrous carbonate, 571.2 g; nickel carbonate, 3.6 g; vanadium dichloride, 4.9 g; water, 5 L; oxalic acid dihydrate, 1260.6 g | Ferromanganese vanadium nickel oxalate dihydrate (as $C_2O_4Mn_{0.50}Fe_{0.493}V_{0.004}Ni_{0.003} \cdot 2H_2O$) obtained in Step S1, 1794.0 g; lithium carbonate, 369.8 g; ammonium dihydrogen phosphate, 1148.9 g; metasilicic acid, 0.8 g; water, 20 L |
| Example 26 | $Li_{1.001}Mn_{0.999}Fe_{0.001}P_{0.999}Si_{0.00104}$ | Manganese carbonate, 1148.2 g; ferrous carbonate, 1.2 g; water, 5 L; oxalic acid dihydrate, 1260.6 g | Ferromanganese oxalate dihydrate (as $C_2O_4Mn_{0.999}Fe_{0.001} \cdot 2H_2O$) obtained in Step S1, 1789.6 g; lithium carbonate, 369.8 g; ammonium dihydrogen phosphate, 1148.9 g; metasilicic acid, 0.8 g; water, 20 L |
| Example 27 | $LiMn_{0.60}Fe_{0.393}V_{0.004}Ni_{0.003}P_{0.9}N_{0.100}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g | Ferromanganese vanadium nickel oxalate dihydrate (as $C_2O_4Mn_{0.60}Fe_{0.393}V_{0.004}Ni_{0.003} \cdot 2H_2O$) obtained in Step S1, 1793.1 g; lithium carbonate, 369.4 g; ammonium dihydrogen phosphate, 1035.1 g; dilute sulfuric acid, 140.0 g; water, 20 L |
| Example 28 | $Li_{1.001}Mn_{0.40}Fe_{0.593}V_{0.004}Ni_{0.003}P_{0.999}Si_{0.00104}$ | Manganese carbonate, 459.7 g; ferrous carbonate, 686.9 g; vanadium dichloride, 4.8 g; nickel carbonate, 3.6 g; water, 5 L; oxalic acid dihydrate, 1260.6 g | Ferromanganese vanadium nickel oxalate dihydrate (as $C_2O_4Mn_{0.40}Fe_{0.593}V_{0.004}Ni_{0.003} \cdot 2H_2O$) obtained in Step S1, 1794.9 g; lithium carbonate, 369.8 g; ammonium dihydrogen phosphate, 1148.9 g; metasilicic acid, 0.8 g; water, 20 L |
| Example 29 | $Li_{1.001}Mn_{0.40}Fe_{0.393}V_{0.204}Ni_{0.003}P_{0.999}Si_{0.00104}$ | Manganese carbonate, 459.7 g; ferrous carbonate, 455.2 g; vanadium dichloride, 248.6 g; nickel | Ferromanganese vanadium nickel oxalate dihydrate (as $C_2O_4Mn_{0.40}Fe_{0.393}V_{0.204}Ni_{0.003} \cdot 2H_2O$) obtained in Step S1, 1785.1 g; lithium carbonate, |

TABLE 1-continued

The raw materials for preparing the core

| NO. | Core | Raw materials used in Step S1 | Raw materials used in Step S2 |
|---|---|---|---|
| | | carbonate, 3.6 g; water, 5 L; oxalic acid dihydrate, 1260.6 g | 369.8 g; ammonium dihydrogen phosphate, 1148.9 g; metasilicic acid, |

TABLE 2

Preparation of the first cladding layer suspension (Step S3)

| NO. | Material for the first cladding layer | Preparation of the first cladding layer suspension |
|---|---|---|
| Comparative examples 3 and 16 | Amorphous $Li_2FeP_2O_7$ | 7.4 g lithium carbonate; 11.6 g ferrous carbonate; 23.0 g ammonium dihydrogen phosphate; 12.6 g oxalic acid dihydrate; controlling pH to be 5 |
| Comparative Examples 11, 13-15 and 17-18; Examples 1-14, 19 and 21-29 | Crystalline $Li_2FeP_2O_7$ | 7.4 g lithium carbonate; 11.6 g ferrous carbonate; 23.0 g ammonium dihydrogen phosphate; 12.6 g oxalic acid dihydrate; controlling pH to be 5 |
| Examples 15-16 | Crystalline $Al_4(P_2O_7)_3$ | 53.3 g aluminium chloride; 34.5 g ammonium dihydrogen phosphate; 18.9 g oxalic acid dihydrate; controlling pH to be 4 |
| Examples 17-18 and 20 | Crystalline $Li_2NiP_2O_7$ | 7.4 g lithium carbonate; 11.9 g nickel carbonate; 23.0 g ammonium dihydrogen phosphate; 12.6 g oxalic acid dihydrate; controlling pH to be 5 |

TABLE 3

Cladding of the first cladding layer (Step S4)

| NO. | Material for first cladding layer and its amount (based on weight of core) | Amount of added core in Step S4 | Amount of cladding material in the first cladding layer suspension | Mixing time (hours) | Drying temperature (° C.) | Sintering temperature (° C.) | Sintering time (hours) |
|---|---|---|---|---|---|---|---|
| Comparative Example 3 | 2% amorphous $Li_2FeP_2O_7$ | 1570.4 g | 31.4 g | 6 | 120 | 500 | 4 |
| Comparative Example 11 | 1% crystalline $Li_2FeP_2O_7$ | 1571.1 g | 15.7 g | 6 | 120 | 650 | 6 |
| Comparative Example 13 | 2% crystalline $Li_2FeP_2O_7$ | 1568.5 g | 31.4 g | 6 | 120 | 650 | 6 |
| Comparative Example 14 | 2% crystalline $Li_2FeP_2O_7$ | 1562.8 g | 31.2 g | 6 | 120 | 650 | 6 |
| Comparative Example 15 | 2% crystalline $Li_2FeP_2O_7$ | 1570.6 g | 31.4 g | 6 | 120 | 650 | 6 |
| Comparative Example 16 | 2% amorphous $Li_2FeP_2O_7$ | 1571.1 g | 31.4 g | 6 | 120 | 500 | 4 |
| Comparative Example 17 | 2% crystalline $Li_2FeP_2O_7$ | 1571.1 g | 31.4 g | 6 | 120 | 650 | 6 |
| Comparative Example 18 | 1% crystalline $Li_2FeP_2O_7$ | 1571.9 g | 15.7 g | 6 | 120 | 650 | 6 |
| Examples 1-4 And 8-10 | 1% crystalline $Li_2FeP_2O_7$ | 1571.9 g | 15.7 g | 6 | 120 | 650 | 6 |
| Example 5 | 2% crystalline $Li_2FeP_2O_7$ | 1571.9 g | 31.4 g | 6 | 120 | 650 | 6 |
| Example 6 | 3% crystalline $Li_2FeP_2O_7$ | 1571.1 g | 47.1 g | 6 | 120 | 650 | 6 |
| Example 7 | 5% crystalline $Li_2FeP_2O_7$ | 1571.9 g | 78.6 g | 6 | 120 | 650 | 6 |
| Example 11 | 1% crystalline $Li_2FeP_2O_7$ | 1572.1 g | 15.7 g | 6 | 120 | 650 | 6 |
| Example 12 | 1% crystalline $Li_2FeP_2O_7$ | 1571.7 g | 15.7 g | 6 | 120 | 650 | 6 |
| Example 13 | 2% crystalline $Li_2FeP_2O_7$ | 1571.4 g | 31.4 g | 6 | 120 | 650 | 6 |
| Example 14 | 2.5% crystalline $Li_2FeP_2O_7$ | 1571.9 g | 39.3 g | 6 | 120 | 650 | 6 |

TABLE 3-continued

Cladding of the first cladding layer (Step S4)

Step S4: Cladding of the first cladding layer

| NO. | Material for first cladding layer and its amount (based on weight of core) | Amount of added core in Step S4 | Amount of cladding material in the first cladding layer suspension | Mixing time (hours) | Drying temperature (° C.) | Sintering temperature (° C.) | Sintering time (hours) |
|---|---|---|---|---|---|---|---|
| Example 15 | 2% crystalline Al$_4$(P$_2$O$_7$)$_3$ | 1571.9 g | 31.4 g | 6 | 120 | 680 | 8 |
| Example 16 | 3% crystalline Al$_4$(P$_2$O$_7$)$_3$ | 1571.9 g | 47.2 g | 6 | 120 | 680 | 8 |
| Example 17 | 1.5% crystalline Li$_2$NiP$_2$O$_7$ | 1571.9 g | 23.6 g | 6 | 120 | 630 | 6 |
| Example 18 | 1% crystalline Li$_2$NiP$_2$O$_7$ | 1570.1 g | 15.7 g | 6 | 120 | 630 | 6 |
| Example 19 | 2% crystalline Li$_2$FeP$_2$O$_7$ | 1571.0 g | 31.4 g | 6 | 120 | 650 | 6 |
| Example 20 | 1% crystalline Li$_2$NiP$_2$O$_7$ | 1571.9 g | 15.7 g | 6 | 120 | 630 | 6 |
| Example 21-24 | 2% crystalline Li$_2$FeP$_2$O$_7$ | 1572.1 g | 31.4 g | 6 | 120 | 650 | 6 |
| Example 22 | 5.50% crystalline Li$_2$FeP$_2$O$_7$ | 1572.1 g | 86.5 g | 6 | 120 | 650 | 6 |
| Example 25 | 1% crystalline Li$_2$FeP$_2$O$_7$ | 1573.0 g | 15.7 g | 6 | 120 | 650 | 6 |
| Example 26 | 1% crystalline Li$_2$FeP$_2$O$_7$ | 1568.6 g | 15.7 g | 6 | 120 | 650 | 6 |
| Example 27 | 1% crystalline Li$_2$FeP$_2$O$_7$ | 1569.2 g | 15.7 g | 6 | 120 | 650 | 6 |
| Example 28 | 2% crystalline Li$_2$FeP$_2$O$_7$ | 1573.9 g | 31.4 g | 6 | 120 | 650 | 6 |
| Example 29 | 2% crystalline Li$_2$FeP$_2$O$_7$ | 1564.1 g | 31.2 g | 6 | 120 | 650 | 6 |

TABLE 4

Preparation of the second cladding layer suspension (Step S5)

| NO. | Material for the second cladding layer | Step S5: Preparation of the second cladding layer suspension |
|---|---|---|
| Comparative Examples 12 And 18; Examples 1-14, 18-19 And 25-27 | Crystalline LiFePO$_4$ | 3.7 g lithium carbonate; 11.6 g ferrous carbonate; 11.5 g ammonium dihydrogen phosphate; 12.6 g oxalic acid dihydrate |
| Comparative Examples 13-16; Examples 15, 17, 20, 21-24 And 28-29 | Crystalline LiCoPO$_4$ | 3.7 g lithium carbonate; 15.5 g cobalt sulfate; 11.5 g ammonium dihydrogen phosphate; 12.6 g oxalic acid dihydrate |
| Comparative Example 17 | Amorphous LiCoPO$_4$ | 3.7 g lithium carbonate; 15.5 g cobalt sulfate; 11.5 g ammonium dihydrogen phosphate; 12.6 g oxalic acid dihydrate |
| Example 16 | Crystalline LiNiPO$_4$ | 3.7 g lithium carbonate; 11.9 g nickel carbonate; 11.5 g ammonium dihydrogen phosphate; 12.6 g oxalic acid dihydrate |

TABLE 5

Cladding of the second cladding layer (Step S6)

Step S6: Cladding of the second cladding layer

| NO. | Material for second cladding layer and its amount (based on weight of core) | Amount of added pyrophosphate-clad material in Step S6 (g) | Amount of cladding material in second cladding layer suspension (g) | Mixing time (hours) | Drying temperature (° C.) | Sintering temperature (° C.) | Sintering time (hours) |
|---|---|---|---|---|---|---|---|
| Comparative Example 12 | 3% crystalline LiFePO$_4$ | 1571.1 | 47.1 | 6 | 120 | 700 | 8 |
| Comparative Example 13 | 4% crystalline LiCoPO$_4$ | 1599.9 | 62.7 | 6 | 120 | 750 | 8 |
| Comparative Example 14 | 4% crystalline LiCoPO$_4$ | 1594.0 | 62.5 | 6 | 120 | 750 | 8 |

TABLE 5-continued

Cladding of the second cladding layer (Step S6)

| NO. | Material for second cladding layer and its amount (based on weight of core) | Amount of added pyrophosphate-clad material in Step S6 (g) | Amount of cladding material in second cladding layer suspension (g) | Mixing time (hours) | Drying temperature (° C.) | Sintering temperature (° C.) | Sintering time (hours) |
|---|---|---|---|---|---|---|---|
| Comparative Example 15 | 4% crystalline LiCoPO$_4$ | 1602.0 | 62.8 | 6 | 120 | 750 | 8 |
| Comparative Example 16 | 4% crystalline LiCoPO$_4$ | 1602.5 | 62.8 | 6 | 120 | 750 | 8 |
| Comparative Example 17 | 4% amorphous LiCoPO$_4$ | 1602.5 | 62.8 | 6 | 120 | 650 | 8 |
| Comparative Example 18 | 3% crystalline LiFePO$_4$ | 1586.8 | 47.1 | 6 | 120 | 700 | 8 |
| Example 1-4 | 3% crystalline LiFePO$_4$ | 1586.8 | 47.1 | 6 | 120 | 700 | 8 |
| Example 5 | 3% crystalline LiFePO$_4$ | 1602.5 | 47.1 | 6 | 120 | 700 | 8 |
| Example 6 | 3% crystalline LiFePO$_4$ | 1618.2 | 47.1 | 6 | 120 | 700 | 8 |
| Example 7 | 3% crystalline LiFePO$_4$ | 1649.6 | 47.1 | 6 | 120 | 700 | 8 |
| Example 8 | 1% crystalline LiFePO$_4$ | 1586.8 | 15.7 | 6 | 120 | 700 | 8 |
| Example 9 | 4% crystalline LiFePO$_4$ | 1586.8 | 62.8 | 6 | 120 | 700 | 8 |
| Example 10 | 5% crystalline LiFePO$_4$ | 1586.8 | 78.6 | 6 | 120 | 700 | 8 |
| Example 11 | 2.50% crystalline LiFePO$_4$ | 1587.8 | 39.3 | 6 | 120 | 700 | 8 |
| Example 12 | 3% crystalline LiFePO$_4$ | 1587.4 | 47.2 | 6 | 120 | 700 | 8 |
| Example 13 | 2% crystalline LiFePO$_4$ | 1602.8 | 31.4 | 6 | 120 | 700 | 8 |
| Example 14 | 3.50% crystalline LiFePO$_4$ | 1610.5 | 55.0 | 6 | 120 | 700 | 8 |
| Example 15 | 2.5% crystalline LiCoPO$_4$ | 1603.3 | 39.3 | 6 | 120 | 750 | 8 |
| Example 16 | 3% crystalline LiNiPO$_4$ | 1619.0 | 47.2 | 6 | 120 | 680 | 8 |
| Example 17 | 2.5% crystalline LiCoPO$_4$ | 1595.5 | 39.3 | 6 | 120 | 750 | 8 |
| Example 18 | 3% crystalline LiFePO$_4$ | 1585.9 | 47.1 | 6 | 120 | 700 | 8 |
| Example 19 | 4% crystalline LiFePO$_4$ | 1602.4 | 62.8 | 6 | 120 | 700 | 8 |
| Example 20 | 3% crystalline LiCoPO$_4$ | 1587.7 | 47.2 | 6 | 120 | 750 | 8 |
| Example 21 | 4% crystalline LiCoPO$_4$ | 1603.5 | 62.9 | 6 | 120 | 750 | 8 |
| Example 22 | 4% crystalline LiCoPO$_4$ | 1658.6 | 62.9 | 6 | 120 | 750 | 8 |
| Example 23 | 5.50% crystalline LiCoPO$_4$ | 1603.5 | 86.5 | 6 | 120 | 750 | 8 |
| Example 24 | 4% crystalline LiCoPO$_4$ | 1603.5 | 62.9 | 6 | 120 | 750 | 8 |
| Example 25 | 3% crystalline LiFePO$_4$ | 1588.7 | 47.2 | 6 | 120 | 700 | 8 |
| Example 26 | 3% crystalline LiFePO$_4$ | 1584.3 | 47.1 | 6 | 120 | 700 | 8 |
| Example 27 | 3% crystalline LiFePO$_4$ | 1584.9 | 47.1 | 6 | 120 | 700 | 8 |
| Example 28 | 4% crystalline LiCoPO$_4$ | 1605.4 | 63.0 | 6 | 120 | 750 | 8 |
| Example 29 | 4% crystalline LiCoPO$_4$ | 1605.4 | 63.0 | 6 | 120 | 750 | 8 |

Note:
In Comparative Example 12, the amount is the amount of the added core

TABLE 6

Cladding of the third cladding layer (Step S8)

| NO. | Third cladding layer | Molar ratio of SP2 to SP3 | Amount* of added two layers-clad material in Step S8 (g) | Amount of sucrose (g) | Mixing time (hours) | Drying temperature (° C.) | Sintering temperature (° C.) | Sintering time (hours) |
|---|---|---|---|---|---|---|---|---|
| Comparative Example 1 | 1% carbon | 2.5 | 1568.5 | 37.3 | 6 | 150 | 650 | 8 |
| Comparative Example 2 | 2% carbon | 2.8 | 1572.2 | 74.7 | 6 | 150 | 680 | 8 |
| Comparative Example 3 | 2% carbon | 2.7 | 1601.8 | 74.6 | 6 | 150 | 680 | 7 |
| Comparative Example 4 | 1% carbon | 2.4 | 1571.0 | 37.3 | 6 | 150 | 630 | 8 |
| Comparative Example 5 | 1.5% carbon | 2.6 | 1570.6 | 56.0 | 6 | 150 | 650 | 7 |
| Comparative Example 6 | 2.5% carbon | 2.8 | 1573.6 | 93.4 | 6 | 150 | 680 | 8 |
| Comparative Example 7 | 1% carbon | 2.7 | 1572.2 | 37.3 | 6 | 150 | 680 | 7 |
| Comparative Example 8 | 1.5% carbon | 2.9 | 1571.1 | 56.0 | 6 | 150 | 680 | 10 |
| Comparative Example 9 | 1% carbon | 2.2 | 1572.2 | 37.3 | 6 | 150 | 600 | 8 |
| Comparative Example 10 | 1% carbon | 2.4 | 1571.1 | 37.3 | 6 | 150 | 630 | 8 |
| Comparative Example 11 | 1% carbon | 2.3 | 1586.8 | 37.3 | 6 | 150 | 620 | 8 |
| Comparative Example 12 | 1% carbon | 2.1 | 1618.2 | 37.3 | 6 | 150 | 600 | 6 |
| Comparative Example 13 | 1% carbon | 2 | 1662.6 | 37.3 | 6 | 120 | 600 | 6 |
| Comparative Example 14 | 1% carbon | 1.8 | 1656.5 | 37.1 | 6 | 120 | 600 | 6 |
| Comparative Example 15 | 1% carbon | 1.7 | 1664.8 | 37.3 | 6 | 100 | 600 | 6 |
| Comparative Example 16 | 1% carbon | 3.1 | 1665.4 | 37.3 | 6 | 150 | 700 | 10 |
| Comparative Example 17 | 1% carbon | 3.5 | 1665.4 | 37.3 | 6 | 150 | 750 | 10 |
| Comparative Example 18 | 1% carbon | 2.2 | 1633.9 | 37.3 | 6 | 150 | 700 | 10 |
| Example 1 | 1% carbon | 2.2 | 1633.9 | 37.3 | 6 | 150 | 700 | 10 |
| Example 2 | 3% carbon | 2.3 | 1633.9 | 111.9 | 6 | 150 | 600 | 9 |
| Example 3 | 4% carbon | 2.1 | 1633.9 | 149.2 | 6 | 150 | 600 | 6 |
| Example 4 | 5% carbon | 2.4 | 1633.9 | 186.5 | 6 | 150 | 630 | 8 |
| Example 5 | 1% carbon | 2.5 | 1649.6 | 37.3 | 6 | 150 | 650 | 8 |
| Example 6 | 1% carbon | 2.5 | 1665.3 | 37.3 | 6 | 150 | 650 | 8 |
| Example 7 | 1% carbon | 2.4 | 1696.7 | 37.3 | 6 | 150 | 630 | 8 |
| Example 8 | 1% carbon | 2.3 | 1602.5 | 37.3 | 6 | 150 | 600 | 9 |
| Example 9 | 1% carbon | 2.2 | 1649.6 | 37.3 | 6 | 150 | 600 | 8 |
| Example 10 | 1% carbon | 2.2 | 1665.3 | 37.3 | 6 | 150 | 600 | 9 |
| Example 11 | 1.5% carbon | 2.3 | 1629.0 | 56.1 | 6 | 150 | 600 | 9 |
| Example 12 | 2% carbon | 2.4 | 1634.6 | 74.7 | 6 | 150 | 630 | 8 |
| Example 13 | 2% carbon | 2.5 | 1634.2 | 74.6 | 6 | 150 | 650 | 8 |
| Example 14 | 2.5% carbon | 2.7 | 1665.5 | 93.3 | 6 | 150 | 680 | 7 |
| Example 15 | 2% carbon | 2.8 | 1642.6 | 74.7 | 6 | 150 | 680 | 8 |
| Example 16 | 1% carbon | 2.7 | 1666.2 | 37.3 | 6 | 150 | 680 | 7 |
| Example 17 | 1.5% carbon | 2.3 | 1634.8 | 56.0 | 6 | 150 | 600 | 9 |
| Example 18 | 1% carbon | 2.6 | 1633.0 | 37.3 | 6 | 150 | 650 | 7 |
| Example 19 | 1.5% carbon | 2.4 | 1665.2 | 56.0 | 6 | 150 | 630 | 8 |
| Example 20 | 1.5% carbon | 2.2 | 1634.8 | 56.0 | 6 | 150 | 600 | 9 |
| Example 21 | 1% carbon | 2.2 | 1666.4 | 37.3 | 6 | 150 | 600 | 9 |
| Example 22 | 1% carbon | 2.3 | 1721.4 | 37.3 | 6 | 150 | 600 | 9 |
| Example 23 | 1% carbon | 2.4 | 1690.0 | 37.3 | 6 | 150 | 630 | 8 |
| Example 24 | 5.5% carbon | 2.6 | 1666.4 | 205.4 | 6 | 150 | 650 | 7 |
| Example 25 | 1% carbon | 2.4 | 1635.9 | 37.4 | 6 | 150 | 630 | 8 |
| Example 26 | 1% carbon | 2.3 | 1631.3 | 37.3 | 6 | 150 | 600 | 9 |
| Example 27 | 1.5% carbon | 2.1 | 1631.9 | 55.9 | 6 | 150 | 600 | 6 |
| Example 28 | 1% carbon | 0.07 | 1668.3 | 37.4 | 6 | 80 | 600 | 6 |
| Example 29 | 1% carbon | 13 | 1668.3 | 37.4 | 6 | 150 | 850 | 10 |

Note:
in Comparative Examples 1-2 and 4-10, the amount* is the amount of added core, and in comparative examples 3 and 11, the amount is the amount of added first layer-clad material

TABLE 7

Investigation of material for first cladding layer

| NO. | Material for first cladding layer | Preparation of the first cladding layer suspension |
|---|---|---|
| Example 30 | $Li_2MgP_2O_7$ | Dissolving 7.4 g lithium carbonate, 8.4 g magnesium carbonate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 31 | $Li_2CoP_2O_7$ | Dissolving 7.4 g lithium carbonate, 15.5 g cobalt sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 32 | $Li_2CUP_2O_7$ | Dissolving 7.4 g lithium carbonate, 16.0 g copper sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 33 | $Li_2ZnP_2O_7$ | Dissolving 7.4 g lithium carbonate, 12.5 g zinc carbonate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 34 | $TiP_2O_7$ | Dissolving 24.0 g titanium sulfate, 23.0 g ammonium dihydrogen phosphate and 12.6 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 35 | $Ag_4P_2O_7$ | Dissolving 67.9 g silver Nitrate, 23.0 g ammonium dihydrogen phosphate and 25.2 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |
| Example 36 | $ZrP_2O_7$ | Dissolving 56.6 g zirconium sulfate, 23.0 g ammonium dihydrogen phosphate and 25.2 g oxalic acid dihydrate in 500 mL of deionized water with a controlled pH of 5, and then stirring and fully reacting for 2 hours to obtain a solution, after which the solution was warmed to 80° C. and maintained at this temperature for 4 hours to obtain a suspension |

TABLE 8

Investigation of material for second cladding layer

| NO. | Material for second cladding layer | Preparation of the second cladding layer suspension |
|---|---|---|
| Example 37 | $Cu_3(PO_4)_2$ | Dissolving 48.0 g copper sulfate, 23.0 g ammonium dihydrogen phosphate, 37.8 g oxalic acid dihydrate in 1500 mL of deionized water, and then stirring and fully reacting for 6 hours to obtain a solution, after which the solution was heated to 120° C. and maintained at this temperature for 6 hours to obtain a suspension |
| Example 38 | $Zn_3(PO_4)_2$ | Dissolving 37.6 g zinc carbonate, 23.0 g ammonium dihydrogen phosphate and 37.8 g oxalic acid dihydrate in 1500 mL of deionized water, and then stirring and fully reacting for 6 hours to obtain a solution, after which the solution was heated to 120° C. and maintained at this temperature for 6 hours to obtain a suspension |
| Example 39 | $Ti_3(PO_4)_4$ | Dissolving 72.0 g titanium sulfate, 46.0 g ammonium dihydrogen phosphate and 75.6 g oxalic acid dihydrate in 1500 mL of deionized water, and then stirring and fully reacting for 6 hours to obtain a solution, after which the solution was heated to 120° C. and maintained at this temperature for 6 hours to obtain a suspension |

TABLE 8-continued

Investigation of material for second cladding layer

| NO. | Material for second cladding layer | Preparation of the second cladding layer suspension |
|---|---|---|
| Example 40 | $Ag_3PO_4$ | Dissolving 50.9 g silver nitrate, 11.5 g ammonium dihydrogen phosphate and 18.9 g oxalic acid dihydrate in 1500 mL of deionized water, and then stirring and fully reacting for 6 hours to obtain a solution, after which the solution was heated to 120° C. and maintained at this temperature for 6 hours to obtain a suspension |
| Example 41 | $Zr_3(PO_4)_4$ | Dissolving 85.0 g zirconium sulfate, 46.0 g ammonium dihydrogen phosphate and 37.8 g oxalic acid dihydrate in 1500 mL of deionized water, and then stirring and fully reacting for 6 hours to obtain a solution, after which the solution was heated to 120° C. and maintained at this temperature for 6 hours to obtain a suspension |
| Example 42 | $AlPO_4$ | Dissolving 13.3 g aluminum chloride, 11.5 g ammonium dihydrogen phosphate and 18.9 g oxalic acid dihydrate in 1500 mL of deionized water, and then stirring and fully reacting for 6 hours to obtain a solution, after which the solution was heated to 120° C. and maintained at this temperature for 6 hours to obtain a suspension |

TABLE 9

Investigation of material for fourth cladding layer

| NO. | Fourth cladding layer Polymer | Amount α of substituent attached to the sugar unit | Number average molecular weight | Novering amount |
|---|---|---|---|---|
| Example 1 | Carboxymethyl chitosan | 60.2% | 26000 | 1% |
| Example 43 | Hydroxyethyl cellulose | 45.9% | 59800 | 1% |
| Example 44 | Carboxymethyl cellulose | 53.3% | 90000 | 1% |
| Example 45 | Guar gum | 38.0% | 30400 | 1% |
| Example 46 | Hydroxypropyl starch | 40.8% | 47300 | 1% |
| Example 47 | Sodium alginate | 44.0% | 18000 | 1% |
| Example 48 | Fucoidan | 42.4% | 23000 | 1% |
| Example 49 | Agar | 39.0% | 26800 | 1% |
| Example 50 | Carrageenan | 62.3% | 32000 | 1% |
| Example 51 | Carboxymethyl chitosan | 15.0% | 112000 | 1% |
| Example 52 | Carboxymethyl chitosan | 90.0% | 76400 | 1% |
| Example 53 | Carboxymethyl chitosan | 60.2% | 26000 | 0.1% |
| Example 54 | Carboxymethyl chitosan | 60.2% | 26000 | 2% |
| Example 55 | Carboxymethyl chitosan | 60.2% | 26000 | 5% |
| Example 56 | Carboxymethyl chitosan | 60.2% | 26000 | 10% |
| Example 57 | Carboxymethyl chitosan | 60.2% | 26000 | 12% |
| Example 58 | Carboxymethyl chitosan | 61.3% | 10000 | 1% |
| Example 59 | Carboxymethyl chitosan | 60.8% | 20000 | 1% |
| Example 60 | Carboxymethyl chitosan | 58.2% | 50000 | 1% |
| Example 61 | Carboxymethyl chitosan | 56.8% | 80000 | 1% |
| Example 62 | Carboxymethyl chitosan | 55.7% | 120000 | 1% |
| Example 63 | Carboxymethyl chitosan | 55.1% | 200000 | 1% |
| Example 64 | Carboxymethyl chitosan | 54.9% | 300000 | 1% |

II. Evaluation of performance

1. Measurement Method for Lattice Change Rate

Under a constant temperature environment of 25° C., a positive electrode active material sample was placed in an X-ray diffractometer (Bruker D8 Discover model) and tested at 1°/minute. The test data was organized and analyzed. Referring to the standard PDF card, the lattice constants a0, b0, c0, and v0 (a0, b0, and c0 represent the length size in individual directions of lattice cell, respectively, v0 represents the volume of lattice cell, which can be directly obtained through XRD refinement results) were calculated. Using the preparation method of button battery described in the above examples, the positive electrode active material sample was prepared into a button battery. The button battery was charged at a small rate of 0.05 C until the current decreased to 0.01 C. Then the positive electrode plate was taken out of the button battery and soaked in DMC for 8 hours. After drying and scraping powder, the particles with a particle size less than 500 nm were obtained by sieving. A sample was taken and its lattice constant v1 was calculated in the same way as the fresh sample tested above. (v0−v1)/v0×100% representing the lattice change rate before and after complete de-intercalation of lithium was shown in the table.

2. Measurement Method for Li/Mn Anti-Site Defect Concentration

The XRD results measured in the "Measurement method for lattice change rate" were compared with the PDF (Powder Diffusion File) card of standard crystal to obtain the Li/Mn anti-site defect concentration. Specifically, the XRD results tested in the "Measurement method for lattice change rate" were imported into the General Structural Analysis System (GSAS) software to automatically obtain refined results, which include the occupancy of different atoms. The Li/Mn anti-site defect concentration was obtained by reading the refined results.

3. Measurement Method for Compaction Density 5 g of positive electrode active material powder were taken and placed in a special mold for compaction (CARVER mold in the United States, model 13 mm), and then the mold was placed on a compaction density instrument. 3T (tonne) of pressure was applied and the thickness of the powders under pressure was read on the equipment (the thickness after pressure relief, the area of the container used for testing being 1540.25 $mm^2$). The compaction density was calculated via $\rho=m/v$.

4. Measurement Method for Surface Oxygen Valence 5 g of positive electrode active material sample were taken and prepared into a button battery according to the preparation method of a button battery described in the above examples. The button battery was charged at a low rate of 0.05 C until the current decreased to 0.01 C. Then the positive electrode plate was taken out of the button battery and soaked in DMC for 8 hours. After drying and scraping powder, the particles with a particle size less than 500 nm were obtained by sieving. The obtained particles were measured with Electron Energy Loss Spectroscopy (EELS, Talos F200S model) to obtain the energy loss near edge structure (ELNES), which can reflect the state density and energy level distribution of elements. Based on the density of states and energy level distribution, the number of occupied electrons was calculated by integrating the density of states in valence band, thereby calculating the surface oxygen valence after charging.

5. Measurement Method for Leaching-Out of Mn (and Fe Doped at Mn Site)

At 45° C., a full battery prepared according to each of the aforementioned examples and comparative example with capacity reduced to 80% by cycling was discharged to the cutoff voltage of 2.0 V at a rate of 0.1 C. Then the battery was disassembled, the negative electrode plate was taken out. 30 discs of unit areas (1540.25 $mm^2$) were randomly taken from the negative electrode plate. Inductively coupled plasma emission spectrum (ICP) was tested by using Agilent ICP-OES730. The amounts of Fe (if Fe was doped at Mn site of the positive electrode active material) and Mn were calculated on the basis of the ICP results, and then the amount of leaching-out of Mn (and Fe doped at Mn site) after cycling was calculated. The testing standard was based on EPA-6010D-2014.

6. Measurement of Elements Manganese and Phosphorus in Positive Electrode Active Material 5 g of the positive electrode active material prepared above was dissolved in 100 mL Lefort aqua regia (concentrated hydrochloric acid: concentrated nitric acid=1:3), the content of each element in the solution was tested by ICP, and then the contents of elements manganese or phosphorus ere measured and converted (the amounts of elements manganese or phosphorus/the amount of positive electrode active material×100%) to obtain the weight ratio.

7. Measurement Method for Initial Specific Capacity of Button Battery

A button battery prepared according to each of the above examples and comparative examples was charged to 4.3V at 0.1 C, then charged at a constant voltage of 4.3V until the current was less than or equal to 0.05 mA, then rested for 5 minutes. Then the button battery was discharged at 0.1 C to 2.0V. The discharge capacity measured at this moment was the initial specific capacity, denoted as D0.

8. Measurement Method for 3 C Charging Constant Current Ratio

Under a constant temperature environment of 25° C., a fresh full battery prepared according to each of the above examples and comparative examples was allowed to rest for 5 minutes and discharged at a rate of 1/3 C to 2.5V, and rested for 5 minutes and was charged at 1/3 C to 4.3V, and then charged at a constant voltage at 4.3V until the current was less than or equal to 0.05 mA. The full battery was allowed to rest for 5 minutes, then the charging capacity at this moment was reported as C0. The full battery was discharged at 1/3 C to 2.5V, rested for 5 minutes, then was charged at 3 C to 4.3V, rested for 5 minutes. The charging capacity at this moment was reported as C1. The 3 C charging constant current ratio was C1/C0×100%.

The higher the 3 C charging constant current ratio, the better the rate performance of the secondary battery.

9. Test of Gas Expansion of Full Battery Stored at 60° C. for 30 Days

A full battery prepared according to each of the above examples and comparative examples was stored with 100% state of charge (SOC) at 60° C. Before, during and after storage, the open circuit voltage (OCV) and AC internal impedance (IMP) of the battery were tested to monitor SOC and the volume of the battery was measured. After every 48 hours of storage, the full battery was taken out and rested for 1 hour, and then the open circuit voltage (OCV) and internal impedance (IMP) were tested. After cooling to room temperature, the volume of the battery was measured using the drainage method. The drainage method included measuring the gravity $F_1$ of the battery separately with a balance that can automatically perform unit conversion with the dial data, and then placing the battery completely in deionized water (with the density of 1 $g/cm^3$), measuring the gravity $F_2$ of the battery at this moment wherein the buoyant force $F_b$ of the battery was $F_1-F_2$, and then according to the Archimedes principle $F_b=\rho \times g \times V$, the volume of battery was calculated: $V=(F_1-F_2)/(\rho \times g)$.

From the OCV and IMP test results, it can be seen that the battery of all examples maintains a SOC of 99% or higher throughout the testing process until the end of storage.

After 30 days of storage, the volume of battery was measured, and the percentage increase in battery volume after storage compared to the previous battery volume was calculated.

10. Test of Cycling Performance at 45° C. of Full Battery

Under a constant temperature environment of 45° C., a full battery was charged at 1 C to 4.3V, and then charged at a constant voltage at 4.3V until the current was less than or equal to 0.05 mA. The full battery was allowed to rest for 5 minutes, then discharged at 1 C to 2.5V. The discharging capacity at this moment was reported as D0. The above charging-discharging cycle was repeated until the discharging capacity was reduced to 80% of D0. The number of cycles the battery had undergone until this moment was reported as the number of cycles at capacity retention of 80% at 45° C.

11. Test for Interplanar Spacing and Angle 1 g of each positive electrode active material powder made above was added into a 50 mL test tube, and injected 10 mL of alcohol with a mass fraction of 75% into the test tube, stirred and dispersed for 30 minutes, and then a clean disposable plastic pipette was used to take an appropriate amount of the above solution and it was added dropwise on a 300-mesh copper mesh, at this time, some of the powder was left on the mesh, and then the mesh was transferred to a TEM (Talos F200s G2) sample chamber with the sample for testing, and the original pictures of TEM test was obtained.

The original images from the above TEM test were opened in DigitalMicrograph software and Fourier transformed (automatically done by the software after clicking on the operation) to obtain the diffraction pattern, and the distance from the diffracted spot to the center of the diffraction pattern was measured to obtain the interplanar spacing, and the angle was calculated according to the Bragg equation.

By comparing the obtained interplanar spacing and the corresponding angle with their standard values, the different substances in the cladding layer can be recognized.

12. Measurement for the Thickness of Cladding Layer

The thickness of the cladding layer was tested via FIB by cutting a thin slice with a thickness of about 100 nm from the center of a single particle of the positive electrode active material produced as described above, and then conducting TEM test on the thin slice to obtain the original picture of the TEM test.

The original pictures from the above TEM test were opened in DigitalMicrograph software, and the interplanar spacing and angle information were used to recognize the cladding layer and measure the thickness of the cladding layer.

The thickness was measured at three locations for the selected particles and averaged.

13. Determination of the Molar Ratio of SP2 and SP3 Morphologys in the Carbon of the Third Cladding Layer This test was performed by Raman spectroscopy. The molar ratio of the two morphologys was confirmed by splitting the peaks of the energy spectrum of the Raman test to obtain $I_d/I_g$, with $I_d$ being the peak intensity of the SP3 carbon and $I_g$ being the peak intensity of the SP2 carbon.

14. Determination of the Chemical Formula of the Inner Core and the Composition of Different Cladding Layers The internal microstructure and surface structure of the positive electrode active material were characterized with high spatial resolution by the spherical Aberration Corrected Scanning Transmission Electron Microscope (ACSTEM). By combining with the three-dimensional reconstruction technology, the chemical formula of the core and the compositions of the respective cladding layers of the positive electrode active material were obtained.

Table 10 shows the performance of the powder of the positive electrode active material in Examples 1-29 and Comparative Examples 1-18 and the performance of the prepared positive electrode plate and battery.

Table 11 shows the thickness of each cladding layer and the weight ratio of manganese to phosphorus of the positive electrode active material prepared in Examples 1-14 and Comparative Examples 3-4 and 12.

Table 12 shows the performance of the powder of the positive electrode active material in Examples 30-42 and the performance of the prepared positive electrode plate and battery.

Table 13 shows the interplanar spacing and angle of the first cladding material and the second cladding material in Examples 1 and 30-42.

Table 14 shows the performance of the powder of the positive electrode active material in Examples 43-64 and the performance of the prepared positive electrode plate and battery.

TABLE 10

| NO. | Lattice change rate (%) | Li/Mn anti-site defect concentration (%) | Compaction density (g/cm³) | Surface oxygen valence | 3 C charging constant current ratio (%) | Leaching-out of Mn and Fe after cycling (ppm) | Capacity of button battery at 0.1 C (mAh/g) | Expansion rate of battery stored at 60° C. for 30 days (%) | Number of cycles at capacity retention of 80% @45° C. |
|---|---|---|---|---|---|---|---|---|---|
| Comparative Example 1 | 11.4 | 5.2 | 1.5 | −1.55 | 50.1 | 2060 | 125.6 | 48.6 | 185 |
| Comparative Example 2 | 10.6 | 3.3 | 1.67 | −1.51 | 54.9 | 1810 | 126.4 | 47.3 | 243 |
| Comparative Example 3 | 10.8 | 3.4 | 1.64 | −1.64 | 52.1 | 1728 | 144.7 | 41.9 | 378 |
| Comparative Example 4 | 4.3 | 2.8 | 1.69 | −1.82 | 56.3 | 1096 | 151.2 | 8.4 | 551 |
| Comparative Example 5 | 2.8 | 2.5 | 1.65 | −1.85 | 58.2 | 31 | 148.4 | 7.5 | 668 |
| Comparative Example 6 | 3.4 | 2.4 | 1.61 | −1.86 | 58.4 | 64 | 149.6 | 8.6 | 673 |
| Comparative Example 7 | 4.5 | 2.4 | 1.73 | −1.83 | 59.2 | 85 | 148.6 | 8.3 | 669 |
| Comparative Example 8 | 2.3 | 2.4 | 1.68 | −1.89 | 59.3 | 30 | 152.3 | 7.3 | 653 |
| Comparative Example 9 | 2.3 | 2.4 | 1.75 | −1.89 | 59.8 | 30 | 152.3 | 7.3 | 672 |
| Comparative Example 10 | 2.3 | 2.2 | 1.81 | −1.9 | 64.1 | 28 | 154.2 | 7.2 | 685 |
| Comparative Example 11 | 2.3 | 2.2 | 1.92 | −1.92 | 65.4 | 12 | 154.3 | 5.4 | 985 |
| Comparative Example 12 | 2.3 | 2.1 | 1.95 | −1.95 | 65.5 | 18 | 154.6 | 4.2 | 795 |
| Comparative Example 13 | 11.4 | 5.2 | 1.63 | −1.96 | 52.4 | 56 | 130.2 | 5.4 | 562 |
| Comparative Example 14 | 8.1 | 3.8 | 1.76 | −1.96 | 58.3 | 41 | 135.1 | 5.1 | 631 |
| Comparative Example 15 | 2 | 1.8 | 2.13 | −1.96 | 61.3 | 8 | 154.3 | 3.7 | 1126 |

TABLE 10-continued

| NO. | Lattice change rate (%) | Li/Mn anti-site defect concentration (%) | Compaction density (g/cm³) | Surface oxygen valence | 3 C charging constant current ratio (%) | Leaching-out of Mn and Fe after cycling (ppm) | Capacity of button battery at 0.1 C (mAh/g) | Expansion rate of battery stored at 60° C. for 30 days (%) | Number of cycles at capacity retention of 80% @45° C. |
|---|---|---|---|---|---|---|---|---|---|
| Comparative Example 16 | 2 | 1.9 | 1.95 | −1.96 | 60.5 | 18 | 152.7 | 4.5 | 1019 |
| Comparative Example 17 | 2 | 1.9 | 1.9 | −1.89 | 60.4 | 24 | 152.4 | 5.1 | 897 |
| Comparative Example 18 | 2.5 | 1.8 | 2.35 | −1.93 | 70.3 | 7 | 157.2 | 4.2 | 1128 |
| Example 1 | 2.5 | 1.8 | 2.35 | −1.93 | 70.3 | 3 | 157.2 | 4.2 | 1569 |
| Example 2 | 2.5 | 1.8 | 2.24 | −1.94 | 70.2 | 2 | 156.3 | 3.7 | 1644 |
| Example 3 | 2.5 | 1.8 | 2.22 | −1.94 | 70.1 | 2 | 155.4 | 3.4 | 1764 |
| Example 4 | 2.5 | 1.8 | 2.21 | −1.95 | 70.2 | 1 | 153.7 | 2.9 | 1792 |
| Example 5 | 2.5 | 1.8 | 2.33 | −1.93 | 70.1 | 2 | 156.7 | 3.1 | 1823 |
| Example 6 | 2.5 | 1.8 | 2.31 | −1.93 | 69.7 | 3 | 156.2 | 2.8 | 1906 |
| Example 7 | 2.5 | 1.8 | 2.28 | −1.93 | 68.4 | 1 | 155.8 | 2.5 | 1985 |
| Example 8 | 2.5 | 1.8 | 2.29 | −1.93 | 69.1 | 4 | 156.4 | 3.4 | 1431 |
| Example 9 | 2.5 | 1.8 | 2.46 | −1.98 | 73.4 | 2 | 157.6 | 2.9 | 1622 |
| Example 10 | 2.5 | 1.8 | 2.49 | −1.98 | 75.4 | 3 | 157.8 | 2.5 | 1866 |
| Example 11 | 2.6 | 1.9 | 2.38 | −1.97 | 72.4 | 4 | 157.3 | 3.5 | 1411 |
| Example 12 | 2.4 | 1.8 | 2.41 | −1.97 | 74.5 | 2 | 156.3 | 2.5 | 1530 |
| Example 13 | 2.7 | 1.9 | 2.42 | −1.97 | 75.3 | 2 | 156.6 | 3.5 | 1589 |
| Example 14 | 2.8 | 1.9 | 2.45 | −1.97 | 76.5 | 1 | 153.8 | 3.7 | 1687 |
| Example 15 | 2.2 | 1.9 | 2.46 | −1.97 | 74.3 | 2 | 153.8 | 3.7 | 1488 |
| Example 16 | 2.1 | 1.9 | 2.47 | −1.98 | 73.1 | 2 | 154.2 | 3.8 | 1502 |
| Example 17 | 2.5 | 1.7 | 2.41 | −1.98 | 75.3 | 3 | 155.4 | 4.5 | 1612 |
| Example 18 | 2.3 | 1.6 | 2.42 | −1.97 | 76.1 | 2 | 154.3 | 4.7 | 1712 |
| Example 19 | 2.2 | 1.7 | 2.43 | −1.97 | 76.8 | 2 | 154.3 | 4.7 | 1728 |
| Example 20 | 2.6 | 1.8 | 2.42 | −1.94 | 75.4 | 2 | 153.9 | 3.3 | 1823 |
| Example 21 | 2.4 | 1.7 | 2.41 | −1.97 | 76.1 | 2 | 154.5 | 3.5 | 1727 |
| Example 22 | 2.4 | 1.8 | 2.32 | −1.95 | 72.1 | 3 | 152.1 | 2.7 | 1956 |
| Example 23 | 2.3 | 1.7 | 2.46 | −1.96 | 76.4 | 2 | 151.4 | 2.4 | 2045 |
| Example 24 | 2.2 | 1.8 | 2.47 | −1.95 | 76.3 | 2 | 152.1 | 2.5 | 1876 |
| Example 25 | 2.1 | 1.7 | 2.49 | −1.98 | 78.4 | 1 | 158.6 | 2.9 | 1948 |
| Example 26 | 3.6 | 2.5 | 2.21 | −1.97 | 56.4 | 4 | 152.3 | 4.8 | 1417 |
| Example 27 | 2.8 | 2.1 | 2.24 | −1.98 | 74.3 | 3 | 155.4 | 3.8 | 1526 |
| Example 28 | 2.5 | 1.9 | 1.95 | −1.94 | 54.7 | 5 | 154.9 | 6.4 | 1380 |
| Example 29 | 2.4 | 1.8 | 1.98 | −1.95 | 68.4 | 3 | 155.6 | 4.5 | 1447 |

TABLE 11

| NO. | Core | First cladding layer | Second cladding layer | Third cladding layer | Fourth cladding layer | Thickness of first cladding layer (nm) |
|---|---|---|---|---|---|---|
| Comparative Example 3 | $LiMn_{0.80}Fe_{0.20}PO_4$ | 2% amorphous $Li_2FeP_2O_7$ | — | 2% carbon | — | 4 |
| Comparative Example 4 | $LiMn_{0.70}Fe_{0.295}V_{0.005}PO_4$ | — | — | 1% carbon | — | — |
| Comparative Example 12 | $Li_{0.999}Mn_{0.60}Fe_{0.393}V_{0.004}Co_{0.003}P_{0.999}S_{0.001}O_4$ | — | 3% crystalline $LiFePO_4$ | 1% carbon | — | — |
| Example 1 | $Li_{0.997}Mn_{0.60}Fe_{0.393}V_{0.004}Co_{0.003}P_{0.997}S_{0.003}O_4$ | 1% crystalline $Li_2FeP_2O_7$ | 3% crystalline $LiFePO_4$ | 1% carbon | 1% | 2 |
| Example 2 | $Li_{0.997}Mn_{0.60}Fe_{0.393}V_{0.004}Co_{0.003}P_{0.997}S_{0.003}O_4$ | 1% crystalline $Li_2FeP_2O_7$ | 3% crystalline $LiFePO_4$ | 3% carbon | 2% | 2 |
| Example 3 | $Li_{0.997}Mn_{0.60}Fe_{0.393}V_{0.004}Co_{0.003}P_{0.997}S_{0.003}O_4$ | 1% crystalline $Li_2FeP_2O_7$ | 3% crystalline $LiFePO_4$ | 4% carbon | 5% | 2 |
| Example 4 | $Li_{0.997}Mn_{0.60}Fe_{0.393}V_{0.004}Co_{0.003}P_{0.997}S_{0.003}O_4$ | 1% crystalline $Li_2FeP_2O_7$ | 3% crystalline $LiFePO_4$ | 5% carbon | 8% | 2 |
| Example 5 | $Li_{0.997}Mn_{0.60}Fe_{0.393}V_{0.004}Co_{0.003}P_{0.997}S_{0.003}O_4$ | 2% crystalline $Li_2FeP_2O_7$ | 3% crystalline $LiFePO_4$ | 1% carbon | 1% | 4 |
| Example 6 | $Li_{0.997}Mn_{0.60}Fe_{0.393}V_{0.004}Co_{0.003}P_{0.997}S_{0.003}O_4$ | 3% crystalline $Li_2FeP_2O_7$ | 3% crystalline $LiFePO_4$ | 1% carbon | 1% | 6 |

TABLE 11-continued

| | | | | | |
|---|---|---|---|---|---|
| Example 7 | Li$_{0.997}$Mn$_{0.60}$Fe$_{0.393}$V$_{0.004}$Co$_{0.003}$P$_{0.997}$S$_{0.003}$O$_4$ | 5% crystalline Li$_2$FeP$_2$O$_7$ | 3% crystalline LiFePO$_4$ | 1% carbon | 1% | 10 |
| Example 8 | Li$_{0.997}$Mn$_{0.60}$Fe$_{0.393}$V$_{0.004}$Co$_{0.003}$P$_{0.997}$S$_{0.003}$O$_4$ | 1% crystalline Li$_2$FeP$_2$O$_7$ | 1% crystalline LiFePO$_4$ | 1% carbon | 2% | 2 |
| Example 9 | Li$_{0.997}$Mn$_{0.60}$Fe$_{0.393}$V$_{0.004}$Co$_{0.003}$P$_{0.997}$S$_{0.003}$O$_4$ | 1% crystalline Li$_2$FeP$_2$O$_7$ | 4% crystalline LiFePO$_4$ | 1% carbon | 2% | 2 |
| Example 10 | Li$_{0.997}$Mn$_{0.60}$Fe$_{0.393}$V$_{0.004}$Co$_{0.003}$P$_{0.997}$S$_{0.003}$O$_4$ | 1% crystalline Li$_2$FeP$_2$O$_7$ | 5% crystalline LiFePO$_4$ | 1% carbon | 2% | 2 |
| Example 11 | Li$_{1.001}$Mn$_{0.60}$Fe$_{0.393}$V$_{0.004}$Co$_{0.003}$P$_{0.999}$Si$_{0.001}$O$_4$ | 1% crystalline Li$_2$FeP$_2$O$_7$ | 2.50% crystalline LiFePO$_4$ | 1.5% carbon | 1% | 2 |
| Example 13 | Li$_{0.995}$Mn$_{0.65}$Fe$_{0.341}$V$_{0.004}$Co$_{0.005}$P$_{0.995}$S$_{0.005}$O$_4$ | 2% crystalline Li$_2$FeP$_2$O$_7$ | 2% crystalline LiFePO$_4$ | 2% carbon | 1% | 4 |
| Example 14 | Li$_{1.002}$Mn$_{0.70}$Fe$_{0.293}$V$_{0.004}$Co$_{0.003}$P$_{0.998}$Si$_{0.002}$O$_4$ | 2.5% crystalline Li$_2$FeP$_2$O$_7$ | 3.50% crystalline LiFePO$_4$ | 2.5% carbon | 1% | 5 |

| NO. | Thickness of second cladding layer (nm) | Thickness of third cladding layer (nm) | Thickness of fourth cladding layer (nm) | Amount of Mn (wt %) | Weight ratio of Mn to P |
|---|---|---|---|---|---|
| Comparative Example 3 | — | 10 | — | 26.1 | 1.383 |
| Comparative Example 4 | — | 5 | — | 24.3 | 1.241 |
| Comparative Example 45 | 7.5 | 5 | — | 19.6 | 1.034 |
| Example 1 | 7.5 | 5 | 2.5 | 18.6 | 1.023 |
| Example 2 | 7.5 | 15 | 5 | 17.8 | 1.023 |
| Example 3 | 7.5 | 20 | 7.2 | 17.6 | 1.023 |
| Example 4 | 7.5 | 25 | 8.6 | 17.4 | 1.023 |
| Example 5 | 7.5 | 5 | 2.5 | 18.4 | 1.011 |
| Example 6 | 7.5 | 5 | 2.5 | 18.1 | 0.999 |
| Example 7 | 7.5 | 5 | 2.5 | 17.3 | 0.975 |
| Example 8 | 2.5 | 5 | 5 | 19.5 | 1.043 |
| Example 9 | 10 | 5 | 5 | 18.3 | 1.014 |
| Example 10 | 12.5 | 5 | 5 | 18.1 | 1.004 |
| Example 11 | 6.3 | 7.5 | 2.5 | 18.6 | 1.026 |
| Example 13 | 5 | 10 | 2.5 | 18.3 | 1.108 |
| Example 14 | 8.8 | 12.5 | 2.5 | 17.3 | 1.166 |

TABLE 12

| NO. | Lattice change rate (%) | Li/Mn anti-site defect concentration (%) | Compaction density (g/cm$^3$) | Surface oxygen valence | 3 C charging constant current ratio (%) | Leaching-out of Mn and Fe after cycling (ppm) | Capacity of button battery at 0.1 C (mAh/g) | Expansion rate of battery stored at 60° C. for 30 days (%) | Number of cycles at capacity retention of 80% @45° C. |
|---|---|---|---|---|---|---|---|---|---|
| Example 30 | 2.4 | 1.9 | 2.36 | −1.97 | 68.7 | 6 | 156.2 | 4.8 | 1421 |
| Example 31 | 2.5 | 1.7 | 2.36 | −1.96 | 70.1 | 5 | 155.6 | 4.6 | 1487 |
| Example 32 | 2.5 | 1.7 | 2.38 | −1.97 | 69.1 | 8 | 155.9 | 4.3 | 1474 |
| Example 33 | 2.6 | 1.8 | 2.39 | −1.98 | 69.4 | 13 | 156.2 | 5.3 | 1390 |
| Example 34 | 2.6 | 1.9 | 2.34 | −1.96 | 71.3 | 10 | 156.4 | 4.6 | 1389 |
| Example 35 | 2.4 | 1.7 | 2.36 | −1.94 | 70.9 | 7 | 157.5 | 5.1 | 1532 |
| Example 36 | 2.5 | 1.9 | 2.33 | −1.92 | 71.6 | 8 | 155.8 | 5.4 | 1404 |
| Example 37 | 2.5 | 1.7 | 2.34 | −1.92 | 68.4 | 10 | 156.1 | 4.9 | 1423 |
| Example 38 | 2.4 | 1.9 | 2.33 | −1.95 | 67.5 | 11 | 154.7 | 5.9 | 1331 |
| Example 39 | 2.2 | 1.8 | 2.36 | −1.94 | 69.4 | 10 | 156.4 | 5.7 | 1410 |
| Example 40 | 2.4 | 1.9 | 2.37 | −1.91 | 71.6 | 13 | 155.8 | 5.3 | 1389 |
| Example 41 | 2.6 | 1.9 | 2.38 | −1.94 | 70.8 | 12 | 154.8 | 5.1 | 1371 |
| Example 41 | 2.4 | 1.9 | 2.36 | −1.92 | 71.5 | 9 | 156.8 | 4.2 | 1574 |

TABLE 13

| NO. | Interplanar spacing of first cladding layer (nm) | Crystal orientation (111) angle of first cladding layer material (°) | Interplanar spacing of second cladding layer (nm) | Crystal orientation (111) angle of second cladding layer material (°) |
| --- | --- | --- | --- | --- |
| Example 1 | 0.303 | 29.496 | 0.348 | 25.562 |
| Example 30 | 0.451 | 19.668 | 0.348 | 25.562 |
| Example 31 | 0.297 | 30.846 | 0.348 | 25.562 |
| Example 32 | 0.457 | 19.456 | 0.348 | 25.562 |
| Example 33 | 0.437 | 20.257 | 0.348 | 25.562 |
| Example 34 | 0.462 | 19.211 | 0.348 | 25.562 |
| Example 35 | 0.450 | 19.735 | 0.348 | 25.562 |
| Example 36 | 0.372 | 23.893 | 0.348 | 25.562 |
| Example 37 | 0.303 | 29.496 | 0.374 | 23.789 |
| Example 38 | 0.303 | 29.496 | 0.360 | 24.710 |
| Example 39 | 0.303 | 29.496 | 0.350 | 25.428 |
| Example 40 | 0.303 | 29.496 | 0.425 | 20.885 |
| Example 41 | 0.303 | 29.496 | 0.356 | 24.993 |
| Example 42 | 0.303 | 29.496 | 0.244 | 36.808 |

TABLE 14

| NO. | Lattice change rate (%) | Li/Mn anti-site defect concentration (%) | Compaction density (g/cm$^3$) | Surface oxygen valence | 3 C charging constant current ratio (%) | Leaching-out of Mn and Fe after cycling (ppm) | Capacity of button battery at 0.1 C (mAh/g) | Expansion rate of battery stored at 60° C. for 30 days (%) | Number of cycles at capacity retention of 80% @45° C. |
| --- | --- | --- | --- | --- | --- | --- | --- | --- | --- |
| Example 1 | 2.5 | 1.8 | 2.35 | −1.93 | 70.3 | 3 | 157.2 | 4.2 | 1569 |
| Example 43 | 2.5 | 1.8 | 2.35 | −1.93 | 70.4 | 2 | 157.2 | 4.3 | 1452 |
| Example 44 | 2.5 | 1.7 | 2.35 | −1.93 | 70.3 | 2 | 157.3 | 4.1 | 1477 |
| Example 45 | 2.5 | 1.8 | 2.33 | −1.93 | 70.3 | 2 | 157.1 | 4.2 | 1468 |
| Example 46 | 2.5 | 1.8 | 2.36 | −1.93 | 70.2 | 1 | 157.2 | 4.3 | 1487 |
| Example 47 | 2.4 | 1.9 | 2.35 | −1.93 | 70.3 | 2 | 157.3 | 4.2 | 1493 |
| Example 48 | 2.5 | 1.8 | 2.35 | −1.93 | 70.4 | 4 | 157.2 | 4.2 | 1523 |
| Example 49 | 2.5 | 1.7 | 2.34 | −1.93 | 70.3 | 3 | 157.1 | 4.1 | 1458 |
| Example 50 | 2.4 | 1.8 | 2.35 | −1.93 | 70.2 | 3 | 157.2 | 4.2 | 1459 |
| Example 51 | 2.5 | 1.8 | 2.34 | −1.93 | 70.3 | 2 | 157.2 | 4.3 | 1302 |
| Example 52 | 2.6 | 1.8 | 2.35 | −1.93 | 70.3 | 3 | 157.1 | 4.2 | 1267 |
| Example 53 | 2.5 | 1.8 | 2.35 | −1.93 | 70.3 | 3 | 157.2 | 4.2 | 1289 |
| Example 54 | 2.5 | 1.9 | 2.34 | −1.93 | 70.2 | 3 | 157.0 | 4.1 | 1551 |
| Example 55 | 2.4 | 1.8 | 2.35 | −1.93 | 69.7 | 2 | 156.3 | 4.2 | 1524 |
| Example 56 | 2.5 | 1.7 | 2.34 | −1.93 | 68.3 | 2 | 155.1 | 4.3 | 1501 |
| Example 57 | 2.6 | 1.8 | 2.35 | −1.93 | 67.2 | 3 | 154.2 | 4.1 | 1462 |
| Example 58 | 2.5 | 1.7 | 2.34 | −1.93 | 70.3 | 3 | 157.2 | 4.2 | 1543 |
| Example 59 | 2.6 | 1.8 | 2.35 | −1.93 | 70.3 | 3 | 157.2 | 4.2 | 1557 |
| Example 60 | 2.5 | 1.9 | 2.34 | −1.93 | 70.2 | 2 | 157.1 | 4.1 | 1546 |
| Example 61 | 2.4 | 1.7 | 2.35 | −1.93 | 70.0 | 2 | 157.0 | 4.2 | 1530 |
| Example 62 | 2.5 | 1.7 | 2.34 | −1.93 | 69.6 | 3 | 156.5 | 4.2 | 1501 |
| Example 63 | 2.3 | 1.8 | 2.34 | −1.93 | 68.9 | 3 | 156.0 | 4.1 | 1483 |
| Example 64 | 2.4 | 1.9 | 2.35 | −1.93 | 68.0 | 3 | 155.6 | 4.1 | 1476 |

As can be seen from Table 10, compared with Comparative Examples, Examples achieve smaller lattice change rate, smaller Li/Mn anti-site defect concentration, larger compaction density, surface oxygen valence closer to −2 valence, less leaching-out of Mn and Fe after cycling, and better battery performance, such as better high-temperature storage performance and high-temperature cycling performance.

As can be seen from Table 11, by doping at manganese and phosphorus sites of lithium iron manganese phosphate (containing 35% manganese and about 20% phosphorus) and cladding with four layers, the content of manganese and the weight ratio of manganese to phosphorus in the positive electrode active material were significantly reduced. In addition, combined with Table 10, it can be seen that the reduction of elements manganese and phosphorus in the positive electrode active material may reduce the leaching-out of manganese ions and iron ion and improve the performance of the batteries therefrom in example 1-14, compared with Comparative Examples 3, 4 and 12.

As can be seen from Table 12, the use of the first cladding layer and the second cladding layer comprising the other elements within the scope of the present application also results in the positive electrode active materials with good performance and achieves good battery performance results.

As can be seen from Table 13, the interplanar spacing and angle of the first cladding layer and the second cladding layer of the present application are within the range described in the present application.

As can be seen from Table 14, under the same condition of other factors, when the polysaccharide and its derivatives that satisfy one or more of the suitable content of the substituent attached to the sugar unit, number average molecular weight and cladding amount are selected as the fourth cladding layer, which can better improve the cycling performance of the battery, without affecting the energy density and rate performance.

It should be noted that this application is not limited to the above embodiments. The above embodiments are only provided as examples, and within the technical solution of the present application, embodiments having substantially the same configuration as the technical idea and achieving the same effects are all included within the technical scope of the present application. In addition, various modifications to the embodiments that can be conceived by those skilled in the art without departing from the scope of the gist of the present application and other embodiments constructed by combining some constituent elements in the embodiments are also included in the scope of the present application.

What is claimed is:

1. A positive electrode active material having a core-shell structure, comprising a core and a shell cladding the core, wherein the core has a chemical formula of $Li_{1+x}Mn_{1-y}A_yP_{1-z}R_zO_4$, in which x is any value in a range of −0.100 to 0.100, y is any value in a range of 0.001 to 0.500, z is any value in the range of 0.001 to 0.100, A comprises Fe, V, and Co, and R is S;

the values of x, y, and z satisfy that an entire core is electrically neutral; and the shell comprises a first cladding layer cladding the core, a second cladding layer cladding the first cladding layer, a third cladding layer cladding the second cladding layer and a fourth cladding layer cladding the third cladding layer, wherein the first cladding layer comprises crystalline pyrophosphates $Li_aMP_2O_7$ and/or $M_b(P_2O_7)_c$, 0≤a≤2, 1≤b≤4, 1≤c≤6, in which the values of a, b and c satisfy that the crystalline pyrophosphate $Li_aMP_2O_7$ or $M_b(P_2O_7)_c$ is electrically neutral, and in which each M in the crystalline pyrophosphates $Li_aMP_2O_7$ and/or $M_b(P_2O_7)_c$ comprises Fe;

the second cladding layer comprises crystalline phosphate $XPO_4$, X comprises Li and Fe;

the third cladding layer is carbon; and the fourth cladding layer comprises a polymer comprising a polysaccharide.

2. The positive electrode active material according to claim 1, wherein a substituent attached to a sugar unit in the polysaccharide comprises-COOH and salts thereof.

3. The positive electrode active material according to claim 1, wherein the polysaccharide comprises hydroxypropyl starch.

4. The positive electrode active material according to claim 1, wherein the polymer has a number average molecular weight of 10,000 to 200,000.

5. The positive electrode active material according to claim 1, wherein a substituent attached to a sugar unit of the polysaccharide is present in a mass percentage α in the polysaccharide, with a being from 20% to 85%.

6. The positive electrode active material according to claim 1, wherein the first cladding layer has a cladding amount of greater than 0 wt % and less than or equal to 6 wt %, based on a weight of the core;

the second cladding layer has a cladding amount of greater than 0 wt % and less than or equal to 6 wt %, based on a weight of the core;

the third cladding layer has a cladding amount of greater than 0 wt % and less than or equal to 6 wt %, based on a weight of the core; and/or the fourth cladding layer has a cladding amount of greater than 0 wt % and less than or equal to 10 wt %, based on a weight of the core.

7. The positive electrode active material according to claim 1, wherein the first cladding layer has a thickness of 1 nm to 10 nm;

the second cladding layer has a thickness of 2 nm to 15 nm;

the third cladding layer has a thickness of 2 nm to 25 nm; and/or the fourth cladding layer has a thickness of 1 nm to 10 nm.

8. The positive electrode active material according to claim 1, wherein in the core, the ratio of y:(1-y) is 1:10 to 1:1; and/or, the ratio of z:(1-z) is 1:9 to 1:999.

9. The positive electrode active material according to claim 1, wherein the crystalline pyrophosphate in the first cladding layer has an interplanar spacing ranging from 0.293 nm to 0.470 nm, and a crystal orientation angle ranging from 18.00° to 32.00°; and the crystalline phosphate in the second cladding layer has an interplanar spacing ranging from 0.244 nm to 0.425 nm, and a crystal orientation angle ranging from 20.00° to 37.00°.

10. The positive electrode active material according to claim 1, wherein the carbon of the third cladding layer is a mixture of SP2 carbon and SP3 carbon.

11. The positive electrode active material according to claim 1, wherein manganese is present in a content of 10 wt % to 35 wt %, based on a total weight of the positive electrode active material.

12. The positive electrode active material according to claim 1, wherein (1) before and after complete de-intercalation of lithium, the positive electrode active material has a lattice change rate of 4% or less.

13. A method for preparing a positive electrode active material, comprising:

providing a core material having a chemical formula of $Li_{1+x}Mn_{1-y}A_yP_{1-z}R_zO_4$, in which x is any value in a range of −0.100 to 0.100, y is any value in a range of 0.001 to 0.500, z is any value in a range of 0.001 to 0.100, A comprises Fe, V, and Co, and R is S; and cladding, wherein cladding further comprises:

providing a suspension of crystalline pyrophosphate $Li_aMP_2O_7$ and/or $M_b(P_2O_7)_c$ and a suspension of $XPO_4$, separately, in which 0≤a≤2, 1≤b≤4, 1≤c≤6, and the values of a, b and c satisfy that the $Li_aMP_2O_7$ or $M_b(P_2O_7)_c$ is electrically neutral, M comprises Fe, adding the core material to the suspension of $Li_aMP_2O_7$ and/or $M_b(P_2O_7)_c$ and the suspension of $XPO_4$ to form a first mixture, X comprises Li and Fe, obtaining a core having a first cladding layer, a second cladding layer, and a third cladding layer by sintering the first mixture, mixing the obtained core having the first cladding layer, the second cladding layer, and the third cladding layer with a polymer solution evenly to form a second mixture, and obtaining the positive electrode active material by drying the second mixture, the polymer solution comprises a polysaccharide, wherein the positive electrode active material has a core-shell structure comprising the core and a shell cladding the core, in which the shell comprises the first cladding layer cladding the core, the second cladding layer cladding the first cladding layer, the third cladding layer cladding the second cladding layer, and a fourth cladding layer cladding the third cladding layer, wherein the first cladding layer comprises the crystalline pyrophosphates $Li_aMP_2O_7$ and/or $M_b(P_2O_7)_c$, the second cladding layer comprises the crystalline phosphate $XPO_4$, the third cladding layer is carbon, and the fourth cladding layer comprises the polysaccharide.

14. The method according to claim 13, wherein providing a core material further comprises:
   (1) mixing a manganese source, a dopant of element A and an acid in a solvent and stirring to obtain particles of a manganese salt doped with element A; and
   (2) mixing the particles of the manganese salt doped with element A, a lithium source, a phosphorus source, and a dopant of element R in a solvent to obtain a slurry, sintering under protection of an inert gas atmosphere to obtain the core doped with elements A and R.

15. The method according to claim 14, wherein
   the mixing in (1) is carried out at a temperature in a range of 20-120° C., and/or
   the stirring in (1) is carried out at 400-700 rpm for 1-9 hours.

16. The method according to claim 14, wherein
   the mixing in (2) is carried out at a temperature in a range of 20-120° C.

17. The method according to claim 14, wherein
   the dopant of element A is one or more of elemental substance, carbonates, sulfates, chlorides, nitrates, salts of organic acid, oxides and hydroxides of one or more elements selected from V, Fe, and Co; and/or
   the dopant of element R is one or more of inorganic acids, organic acids, sulfates, chlorides, nitrates, salts of organic acid, oxides, and hydroxides.

18. The method according to claim 13, wherein the cladding further comprises:
   a first cladding step comprising: dissolving a source of element M, a phosphorus source and an acid, and optionally a source of lithium, in a solvent to obtain a first cladding layer suspension; mixing the core material with the first cladding layer suspension, drying, and sintering to obtain a first cladding layer-clad material;
   a second cladding step comprising: dissolving a source of element X, a phosphorus source and an acid in a solvent to obtain a second cladding layer suspension; mixing the first cladding layer-clad material obtained in the first cladding step with the second cladding layer suspension, drying, and sintering to obtain a two cladding layers-clad material;
   a third cladding step comprising: dissolving a carbon source in a solvent to obtain a third cladding layer solution; adding the two cladding layers-clad material to the third cladding layer solution, mixing, drying and sintering to obtain a three cladding layers-clad material; and
   a fourth cladding step comprising: dissolving a polymer in a solvent to obtain a fourth cladding layer solution; adding the three cladding layers-clad material to the fourth cladding layer solution, mixing and drying to obtain a four cladding layers-clad material as the positive electrode active material.

19. The method according to claim 18, wherein
   in the first cladding step,
   the pH of the solution containing the source of elemental M, the phosphorus source and the acid is from 3.5 to 6.5; and/or
   the sintering is carried out at 650° C. to 800° C. for 2 to 6 hours.

20. The method according to claim 18, wherein
   in the second cladding step, the second cladding layer suspension is stirred and reacted for 1 to 10 hours, and warmed to a temperature between 60° C. and 150° C. and maintained at that temperature for 2 to 10 hours; and/or
   the sintering is carried out at 500° C. to 700° C. for 6 to 10 hours.

21. The method according to claim 18, wherein
   the sintering in the third cladding step is carried out at 700° C. to 800° C. for 6 to 10 hours.

22. A positive electrode plate comprising a positive electrode current collector and a positive electrode film layer provided on at least one surface of the positive electrode current collector, wherein the positive electrode film layer comprises the positive electrode active material according to claim 1, and the positive electrode active material is present in the positive electrode film layer in a content of 90 wt % to 99.5 wt %, based on total weight of the positive electrode film layer.

23. A secondary battery comprising the positive electrode active material according to claim 1.

24. An electrical device comprising the secondary battery according to claim 23.

* * * * *